US011095177B2

(12) United States Patent
Koga

(10) Patent No.: US 11,095,177 B2
(45) Date of Patent: Aug. 17, 2021

(54) COIL

(71) Applicant: AISIN AW CO., LTD., Anjo (JP)

(72) Inventor: Kiyotaka Koga, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 59 days.

(21) Appl. No.: 16/638,669

(22) PCT Filed: Sep. 20, 2018

(86) PCT No.: PCT/JP2018/034856
§ 371 (c)(1),
(2) Date: Feb. 12, 2020

(87) PCT Pub. No.: WO2019/065460
PCT Pub. Date: Apr. 4, 2019

(65) Prior Publication Data
US 2021/0194306 A1 Jun. 24, 2021

(30) Foreign Application Priority Data

Sep. 28, 2017 (JP) .............................. JP2017-188340

(51) Int. Cl.
*H02K 3/04* (2006.01)
*H02K 3/46* (2006.01)

(52) U.S. Cl.
CPC ................. *H02K 3/04* (2013.01); *H02K 3/46* (2013.01)

(58) Field of Classification Search
CPC .................................. H02K 3/04; H02K 3/46
See application file for complete search history.

(56) References Cited

U.S. PATENT DOCUMENTS

| 2017/0237321 A1* | 8/2017 | Baba .................. H02K 15/0081 310/208 |
| 2017/0317565 A1* | 11/2017 | Hatch ..................... H02K 15/06 |
| 2018/0309337 A1* | 10/2018 | Lee ........................... H02K 3/50 |

FOREIGN PATENT DOCUMENTS

JP  2016-123249 A  7/2016

OTHER PUBLICATIONS

Dec. 25, 2018 International Search Report issued in International Patent Application No. PCT/JP2018/034856.

* cited by examiner

*Primary Examiner* — Naishadh N Desai
(74) *Attorney, Agent, or Firm* — Oliff PLC

(57) ABSTRACT

A coil wound around a core in which a plurality of slots that extend in an axial direction are arranged in a circumferential direction, the coil including a plurality of slot-housed portions respectively disposed in the plurality of slots; and a plurality of crossover portions that each connect between a first slot-housed portion and a second slot-housed portion, which are a pair of slot-housed portions of the plurality of slot-housed portions disposed in slots of the plurality of slots that are different from each other, on an outer side in the axial direction with respect to the core.

8 Claims, 10 Drawing Sheets

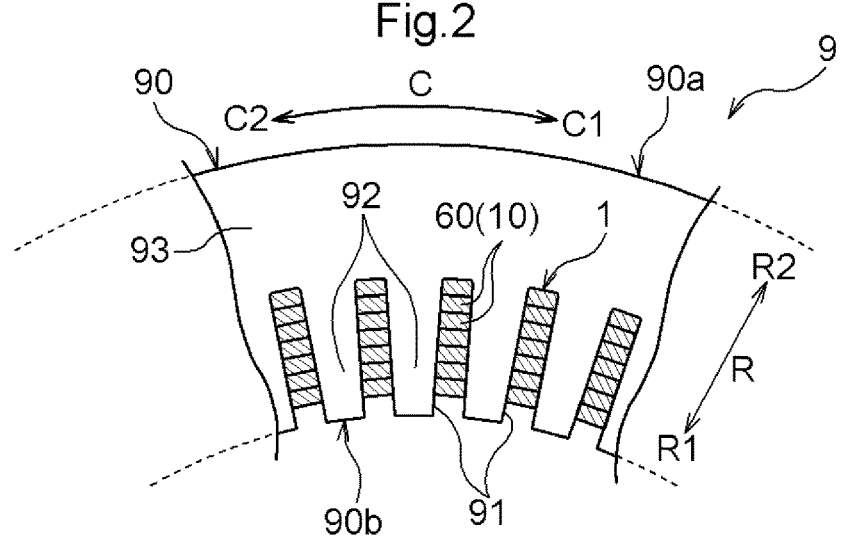
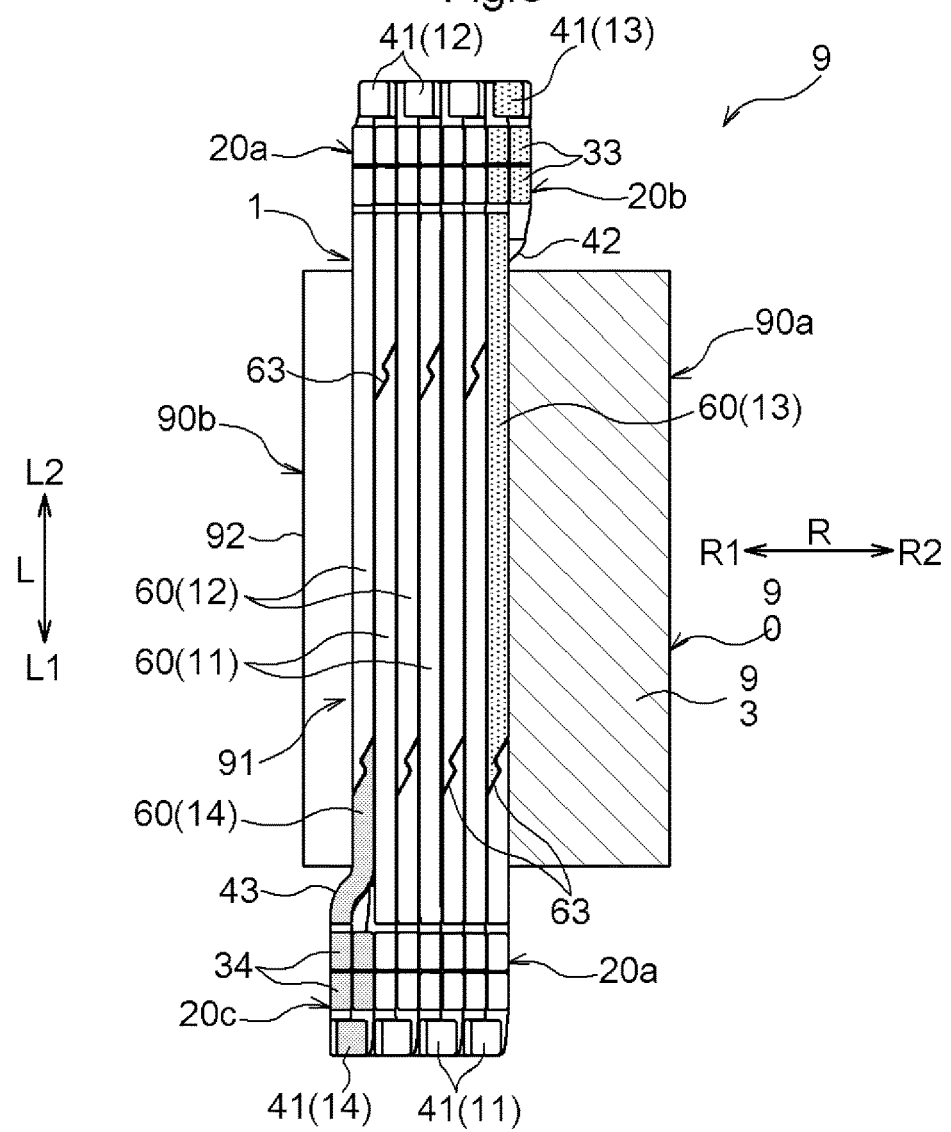

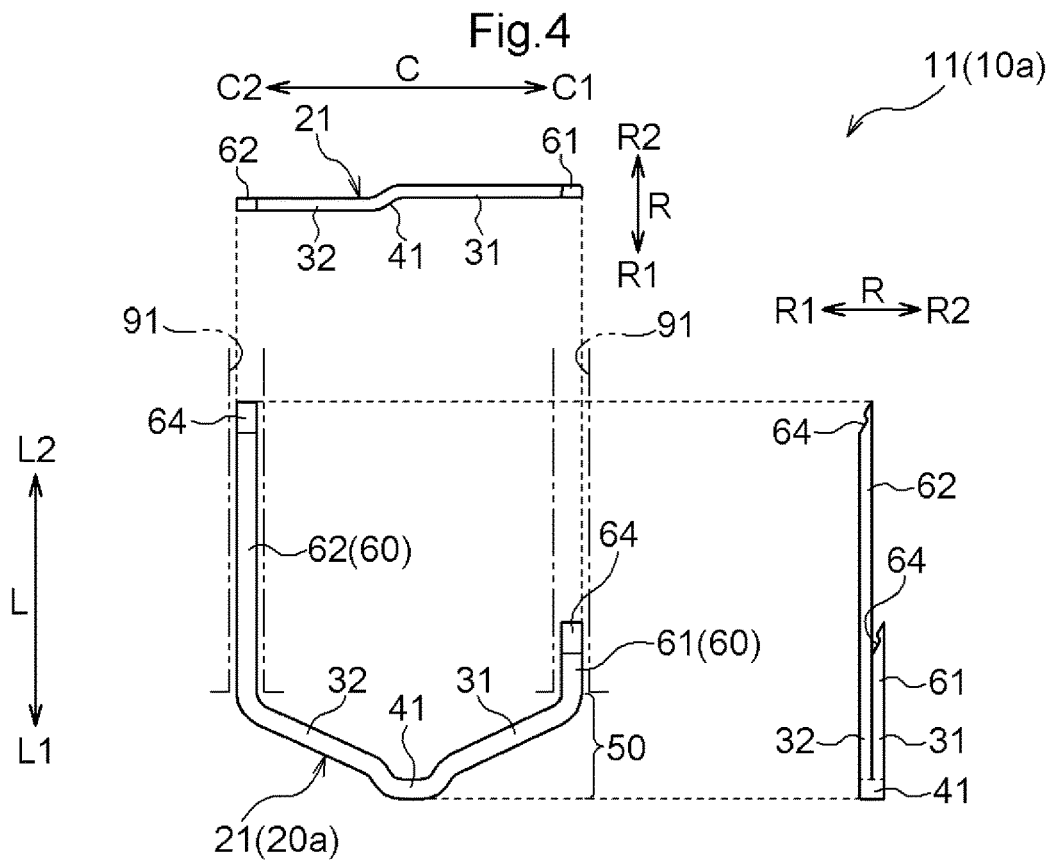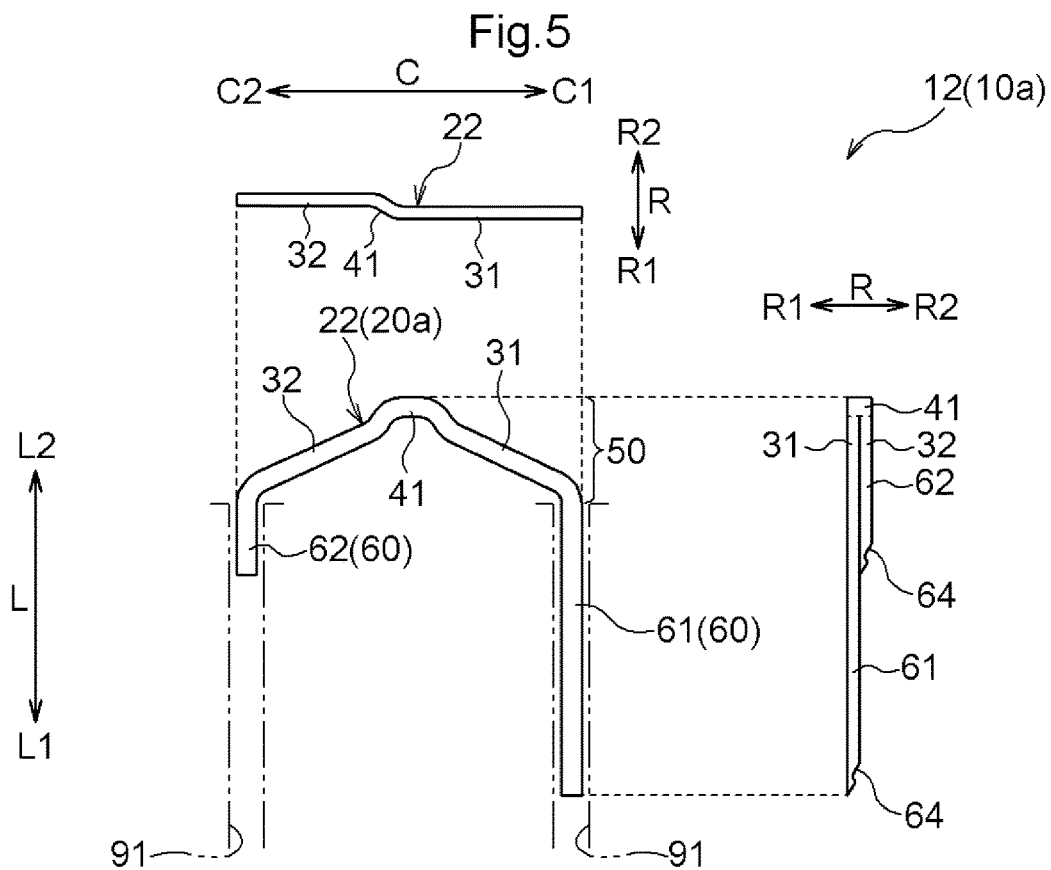

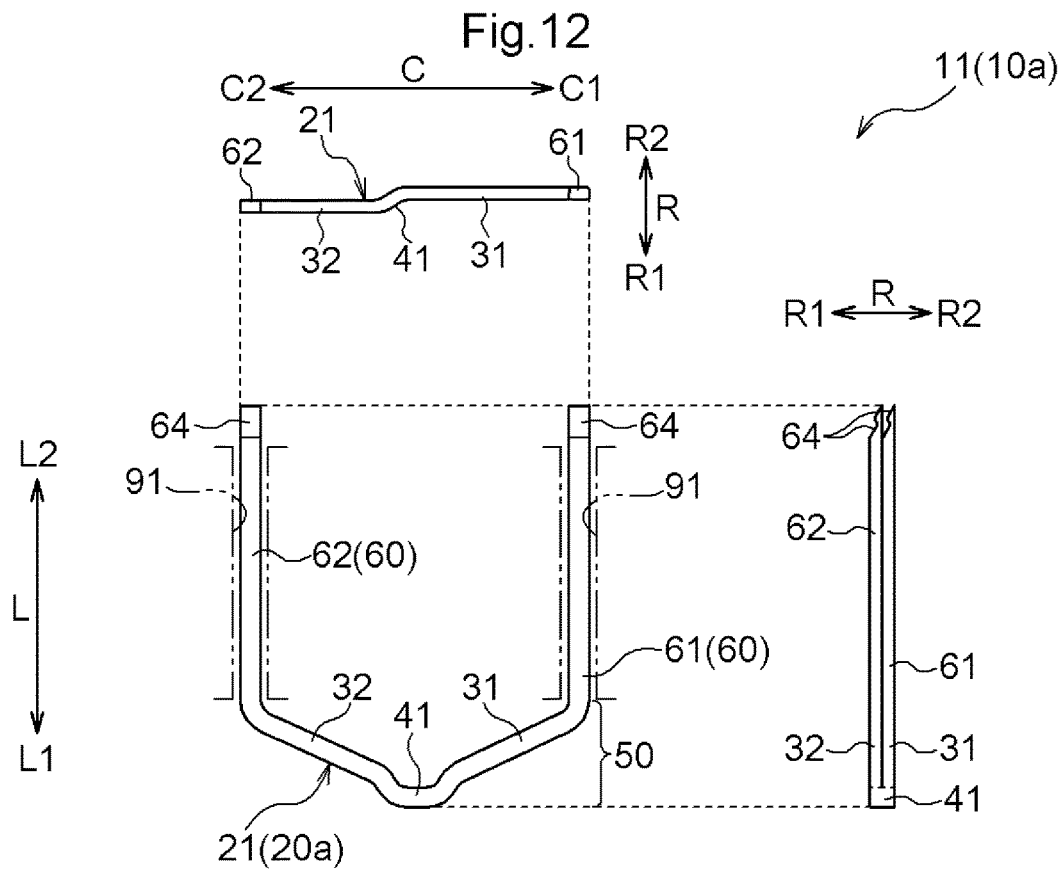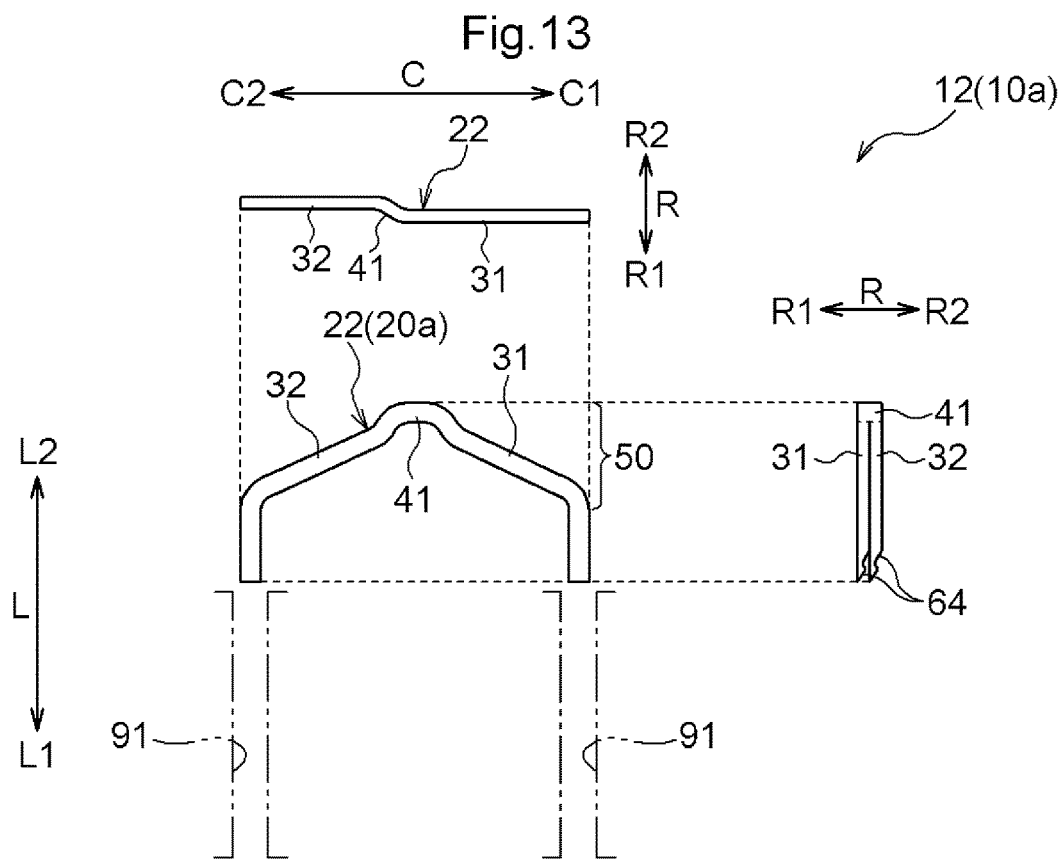

COIL

BACKGROUND

The present disclosure relates to a coil wound around a core in which a plurality of slots that extend in the axial direction are arranged in the circumferential direction.

An example of the above coil is described in Japanese Patent Application Publication No. 2016-123249 (JP 2016-123249 A). JP 2016-123249 A describes a technique of forming a coil using a plurality of coaxially wound portions (cassette coils) formed by winding a conductor between a pair of slots a plurality of times. Specifically, in the technique described in JP 2016-123249 A, a coil is formed using two types of coaxially wound portions, namely first coaxially wound portions and second coaxially wound portions, the number of windings of which is less than that of the first coaxially wound portions by one. In order that a rotary electric machine in which the coil is used has desired characteristics, it is occasionally desirable that the number of slot-housed portions disposed side by side in the radial direction in each slot should be an odd number. With the technique described in JP 2016-123249 A, such a requirement can be met by forming the coil as described above.

In the case where a coil is formed using a plurality of coaxially wound portions as described above, the coil is wound around a core by radially pushing out the 2.0 plurality of coaxially wound portions, which are disposed on the inner side in the radial direction with respect to the core, toward the outer side in the radial direction to insert the slot-housed portions of the coaxially wound portions into the slots from the inner side in the radial direction. It is necessary that each of the coaxially wound portions should be deformed so as to vary the clearance in the circumferential direction between the pair of slot-housed portions of the coaxially wound portion in the course of this insertion. Therefore, with such a winding method, it is not easy to dispose the slot-housed portions in predetermined layers in the slots. With such a winding method, in addition, there tends to be little freedom in the shape of the slots, since it is necessary that the slots should be shaped such that the circumferential width of the slots at the opening portion is the same as the circumferential width of the slots at the inner portion (fully open slot shape), for example.

In order to solve such problems, it is conceivable to form a coil using a plurality of segment conductors. For example, Japanese Patent Application Publication No. 2015-23771 (JP 2015-23771 A) and Japanese Patent Application Publication No. 2017-34860 (JP 2017-34860 A) describe a technique of forming a coil using a plurality of segment conductors. In the techniques described in JP 2015-23771 A and JP 2017-34860 A, however, the number of slot-housed portions disposed side by side in the radial direction in each slot is an even number, and cannot be an odd number, as illustrated in FIG. 6 of JP 2015-23771 A and FIG. 22 of JP 2017-34860 A.

Thus, it is desirable to achieve a technique that makes it possible to appropriately form a coil, in which the number of slot-housed portions disposed side by side in the radial direction in each slot is an odd number, using a plurality of segment conductors.

In view of the foregoing, the present disclosure provides a coil wound around a core in which a plurality of slots that extend in an axial direction are arranged in a circumferential direction, including: a plurality of slot-housed portions respectively disposed in the plurality of slots; and a plurality of crossover portions that each connect between a first slot-housed portion and a second slot-housed portion, which are a pair of slot-housed portions of the plurality of slot housed portions disposed in slots of the plurality of slots that are different from each other, on an outer side in the axial direction with respect to the core, in which: the plurality of crossover portions include a first crossover portion that connects between the first slot-housed portion and the second slot-housed portion which are disposed in layers that are adjacent to each other in a radial direction, a second crossover portion that connects between the first slot-housed portion and the second slot-housed portion which are disposed in a layer on an outermost side in the radial direction, and a third crossover portion disposed on an opposite side, in the axial direction, of the core from a side on which the second crossover portion is disposed to connect between the first slot-housed portion and the second slot-housed portion which are disposed in a layer on an innermost side in the radial direction; the first crossover portion includes a portion disposed at a position in the radial direction corresponding to the first slot-housed portion and a portion disposed at a position in the radial direction corresponding to the second slot-housed portion; the second crossover portion includes a portion disposed at the position in the radial direction corresponding to the first slot-housed portion, an outside portion disposed on an outer side in the radial direction with respect to the position in the radial direction corresponding to the first slot-housed portion and the position in the radial direction corresponding to the second slot-housed portion, and a portion disposed at the position in the radial direction corresponding to the second slot-housed portion; the third crossover portion includes a portion disposed at the position in the radial direction corresponding to the first slot-housed portion, an inside portion disposed on an inner side in the radial direction with respect to the position in the radial direction corresponding to the first slot-housed portion and the position in the radial direction corresponding to the second slot-housed portion, and a portion disposed at the position in the radial direction corresponding to the second slot-housed portion; and the coil is formed by joining a first segment conductor, which has at least a part of the first crossover portion, a second segment conductor, which has at least the outside portion of the second crossover portion, and a third segment conductor, which has at least the inside portion of the third crossover portion, to each other.

With the characteristic configuration described above, the second crossover portion which connects between the pair of slot-housed portions which are disposed in the layer (i.e. outermost layer) on the outermost side in the radial direction and the third crossover portion which connects between the pair of slot-housed portions which are disposed in the layer (i.e. innermost layer) on the innermost side in the radial direction are disposed on the opposite sides from each other in the axial direction with respect to the core. Hence, it is possible to achieve a coil in which the number of the slot-housed portions which are disposed side by side in the radial direction in each slot is an odd number.

With the characteristic configuration described above, the second crossover portion includes the outside portion, and therefore it is possible to dispose the plurality of second crossover portions such that the respective arrangement regions thereof in the circumferential direction partially overlap each other while avoiding interference therebetween. In addition, the third crossover portion includes the inside portion, and therefore it is possible to dispose the plurality of third crossover portions such that the respective arrangement regions thereof in the circumferential direction partially overlap each other while avoiding interference therebetween. Hence, the coil which includes the plurality of second crossover portions and the plurality of third crossover portions can be formed appropriately.

With the characteristic configuration described above, moreover, the coil is formed by joining the first segment conductor, which has at least a part of the first crossover portion, the second segment conductor, which has at least the outside portion of the second crossover portion, and the third segment conductor, which has at least the inside portion of the third crossover portion, to each other. That is, the outside portion and the inside portion which are disposed on the opposite sides from each other in the axial direction with respect to the core are required in order to appropriately form a coil in which the number of the slot-housed portions which are disposed side by side in the radial direction in each slot is an odd number, and the outside portion and the inside portion can be provided to the segment conductors which are different from each other. Hence, it is possible to achieve a coil in which the number of the slot-housed portions described above is an odd number while appropriately securing the ease of disposing the segment conductors in the core.

As described above, with the characteristic configuration described above, it is possible to appropriately form a coil, in which the number of slot-housed portions disposed side by side in the radial direction in each slot is an odd number, using a plurality of segment conductors.

Further characteristics and advantages of the coil will become clear from the following description of embodiments made with reference to the drawings.

BRIEF DESCRIPTION OF THE DRAWINGS

FIG. 2 is a sectional view, taken in a direction that is orthogonal to the axial direction, of a part of a stator according to the first embodiment.

FIG. 3 is a sectional view, taken along the axial direction, of a part of the stator according to the first embodiment.

FIG. 4 illustrates a first segment conductor according to the first embodiment.

FIG. 5 illustrates a different first segment conductor according to the first embodiment.

FIG. 12 illustrates a first segment conductor according to a third embodiment,

FIG. 13 illustrates a different first segment conductor according to the third embodiment.

DETAILED DESCRIPTION OF EMBODIMENTS

First Embodiment

Figure 1:
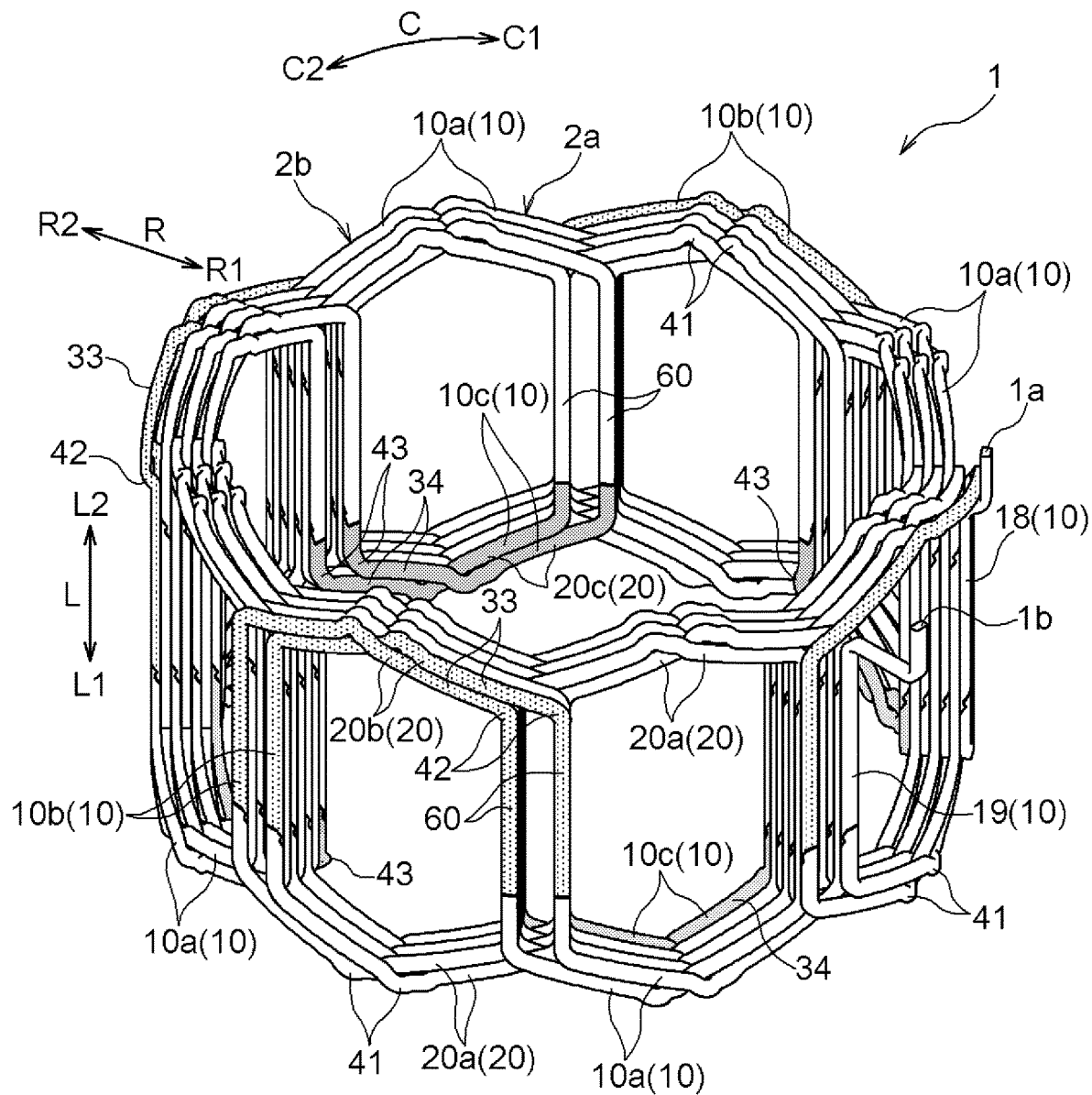
FIG. 1 is a perspective view of a coil according to a first embodiment.

A coil according to a first embodiment will be described below with reference to FIGS. 1 to 8. In the following description, the terms "axial direction L", "radial direction R", and "circumferential direction C" are defined with reference to the axis (axis of an inner peripheral surface 90b in a cylindrical shape or an outer peripheral surface 90a in a cylindrical shape) of a core 90 (see FIGS. 2 and 3) around which a coil 1 is wound. That is, the inner peripheral surface 90b or the outer peripheral surface 90a of the core 90 is a surface (core reference surface), with reference to which each direction is defined. As illustrated in FIG. 1, one side in the axial direction L (in the present embodiment, the side on which third crossover portions 20c are disposed with respect to the core 90 in the axial direction L) is defined as a first axial side L1, and the other side in the axial direction L (the opposite side from the first axial side L1) is defined as a second axial side L2. In addition, one side in the circumferential direction C (in the present embodiment, the clockwise side when the core 90 is seen from the second axial side L2) is defined as a first circumferential side C1, and the other side in the circumferential direction C (the opposite side from the first circumferential side C1) is defined as a second circumferential side C2. In the following description, each direction for the coil 1 is defined with the coil 1 wound around the core 90.

The phrase "extend in a certain direction" as used herein for the shape of a member is not limited to extension of the member in a direction that is parallel to a reference direction defined as the certain direction, and also includes extension of the member in a direction intersecting the reference direction if the intersection angle is within a predetermined range (e.g. less than 45 degrees). In addition, terms related to the dimension, the arrangement direction, the arrangement position, etc. (such as "parallel", for example) as used herein may allow a difference due to an error (an error that may be tolerated during manufacture).

As illustrated in FIGS. 2 and 3, the coil 1 is wound around the core 90 in which a plurality of slots 91 that extend in the axial direction L are arranged in the circumferential direction C. In the present embodiment, the core 90 is used in a stator 9 of a rotary electric machine of a rotating field type. That is, the core 90 around which the coil 1 is wound is a core (stator core) of the stator 9, and is an armature core. Thus, in the present embodiment, the coil 1 is a coil wound around the stator core. In the present embodiment, in addition, the coil 1 is an armature coil wound around an armature core. The core 90 is formed using a magnetic material. For example, the core 90 is formed by stacking a plurality of magnetic plates (e.g. electromagnetic steel plates such as silicon steel plates), or the core 90 is formed using a pressed powder material, which is obtained by press-forming powder of a magnetic material, as a main constituent element. The core 90 is formed in a cylindrical shape. Herein, the term "rotary electric machine" refers to any of a motor (electric motor), a generator (electric generator), and a motor generator that functions both as a motor and as a generator as necessary.

As illustrated in FIG. 2, each of the slots 91 which are formed in the core 90 has an opening portion (radially opening portion) on the side on which a rotor (not illustrated) is disposed in the radial direction R. In the present embodiment, the core 90 is a stator core used in a rotary electric machine of an inner rotor type, and each of the slots 91 has a radially opening portion on the inner side (radially inner side R1) in the radial direction R. In the present embodiment, each of the slots 91 is formed so as to extend in parallel with the radial direction R. In the present embodiment, in addition the slots 91 are formed such that the width (clearance between side surface portions on both sides in the circumferential direction C) of the slots 91 at least a portion at which the coil 1 (slot-housed portions 60 to be discussed later) is disposed is uniform along the radial direction R. In the example illustrated in FIG. 2, the slots 91 are formed such that the width, in the circumferential direction C, of the slots 91 including the radially opening portion is uniform along the radial direction R. However, the width, in the circumferential direction C, of the slots 91 at the radially opening portion may be smaller than the width, in the circumferential direction C, of the slots 91 at a portion at which the coil 1 (slot-housed portions 60) is disposed (i.e. the slots 91 may be semi-open slots). In addition, as illustrated in FIG. 3, each of the slots 91 has an opening portion on both sides in the axial direction L. In the present embodiment, each of the slots 91 is formed so as to extend in parallel with the axial direction L.

As illustrated in FIG. 2, a tooth 92 is formed between two slots 91 that are adjacent to each other in the circumferential direction C. In other words, the core 90 includes a yoke portion 93 formed in a ring shape as viewed in the axial direction L, and a plurality of teeth 92 that extend from the yoke portion 93 toward the side (in the present embodiment, the radially inner side R1) in the radial direction R on which the rotor is disposed. A slot 91 that has a bottom portion on the outer side (radially outer side R2) in the radial direction R is formed between two teeth 92 that are adjacent to each other in the circumferential direction C. The cylindrical inner peripheral surface 90b of the core 90 is formed by respective end surfaces of the plurality of teeth 92 on the radially inner side R1. In addition, the cylindrical outer peripheral surface 90a of the core 90 is formed by the outer peripheral surface of the yoke portion 93, In the case where the outer peripheral surface of the core 90 is provided with a projecting portion for attachment to a case etc., a portion of the outer peripheral surface of the yoke portion 93 excluding the projecting portion is formed in a cylindrical shape. In the present embodiment, a total of 48 slots 91 are disposed in the core 90 at constant intervals along the circumferential direction C, although not illustrated.

The coil 1 includes a plurality of slot-housed portions 60 disposed in the respective slots 91. In the present embodiment, the slot-housed portions 60 are disposed in the respective slots 91 so as to extend in parallel with the axial direction. L. The coil 1 has an odd number-layer wound structure in which an odd number of slot-housed portions 60 are arranged in the radial direction R. That is, as illustrated in FIGS. 2 and 3, when the arrangement region in the radial direction R for one slot-housed portion 60 is defined as one layer, the plurality of slot-housed portions 60 are disposed separately in an odd number of layers inside each slot 91. In the present embodiment, the coil 1 has a 7-layer wound structure, in which the plurality of slot-housed portions 60 are disposed separately in seven layers inside each slot 91. In the present embodiment, in addition, the plurality of slot-housed portions 60 are disposed side by side in one line along the radial direction R inside each slot 91. Hence, in the present embodiment, seven slot-housed portions 60 are disposed side by side in the radial direction R inside each slot 91.

The coil 1 includes a plurality of crossover portions 20 that each connect between a pair of slot-housed portions 60 disposed in different slots 91 on the outer side in the axial direction L with respect to the core 90, As discussed later, the plurality of crossover portions 20 include first crossover portions 20a, second crossover portions 20b, and third crossover portions 20c. Here, as illustrated in FIGS. 4 to 7, the slot-housed portion 60 which is disposed on the first circumferential side C1, of the pair of slot-housed portions 60 Which are connected to each other by the crossover portion 20, is defined as a first slot-housed portion 61, and the slot-housed portion 60 which is disposed on the second circumferential side C2 is defined as a second slot-housed portion 62. As illustrated in FIGS. 1 and 3, the plurality of crossover portions 20 are gathered to form coil end portions that project toward both sides in the axial direction L with respect to the core 90.

In the present embodiment, the coil 1 is a coil with a plurality of phases (in the present example, three phases), and the coil 1 is wound around the core 90 such that the slots 91 for the respective phases (in the present example, a slot 91 for U-phase, a slot 91 for V-phase, and a slot 91 for W-phase) repeatedly appear along the circumferential direction C. In the present embodiment, the number of slots 91 for each pole and each phase is "2", and the coil 1 is wound around the core 90 such that two slots 91 for U-phase, two slots 91 for V-phase, and two slots 91 for W-phase repeatedly appear along the circumferential direction C. In FIG. 1, only one of a plurality of phase coils (in the present example, three phase coils) of the coil. 1 is illustrated. The phase coils for the other phases of the coil 1 also have the same configuration as the phase coil illustrated in FIG. 1 except for the arrangement position in the circumferential direction C with respect to the core 90, although not illustrated.

The coil 1 is constituted by joining a plurality of segment conductors 10 to each other. The segment conductors 10 each have a joint portion 64 at end portions on both sides in the extension direction of the segment conductor 10 (see FIGS. 4 to 7), and the joint portions 64 of the plurality of segment conductors 10 are sequentially joined to each other to form the coil 1. The segment conductors 10 are each constituted using a single continuous linear conductor. Here, the term "continuous" means that the conductor is formed integrally in the extension direction without a joint. The linear conductor is constituted of a conductive material such as copper and aluminum. The surface of the linear conductor is coated with an insulating film made of an electrically insulating material such as a resin except at locations (such as joint locations 63 (see FIG. 3) to be discussed later) for electrical connection with a different member. In the present embodiment, as illustrated in FIG. 2, a linear conductor (rectangular wire) with its cross section, orthogonal to the extension direction, having a rectangular shape, is used as the linear conductor which constitutes the segment conductor 10. Here, the term "rectangular shape" includes a rectangle in a square shape, a rectangle with arcuately chamfered (rounded) or linearly chamfered (beveled) corner portions, a rectangle defined such that the absolute value of the difference between each of the internal angles thereof and 90 degrees is less than an angle (such as 5 degrees or 10 degrees, for example) determined in advance, etc.

Figure 8:
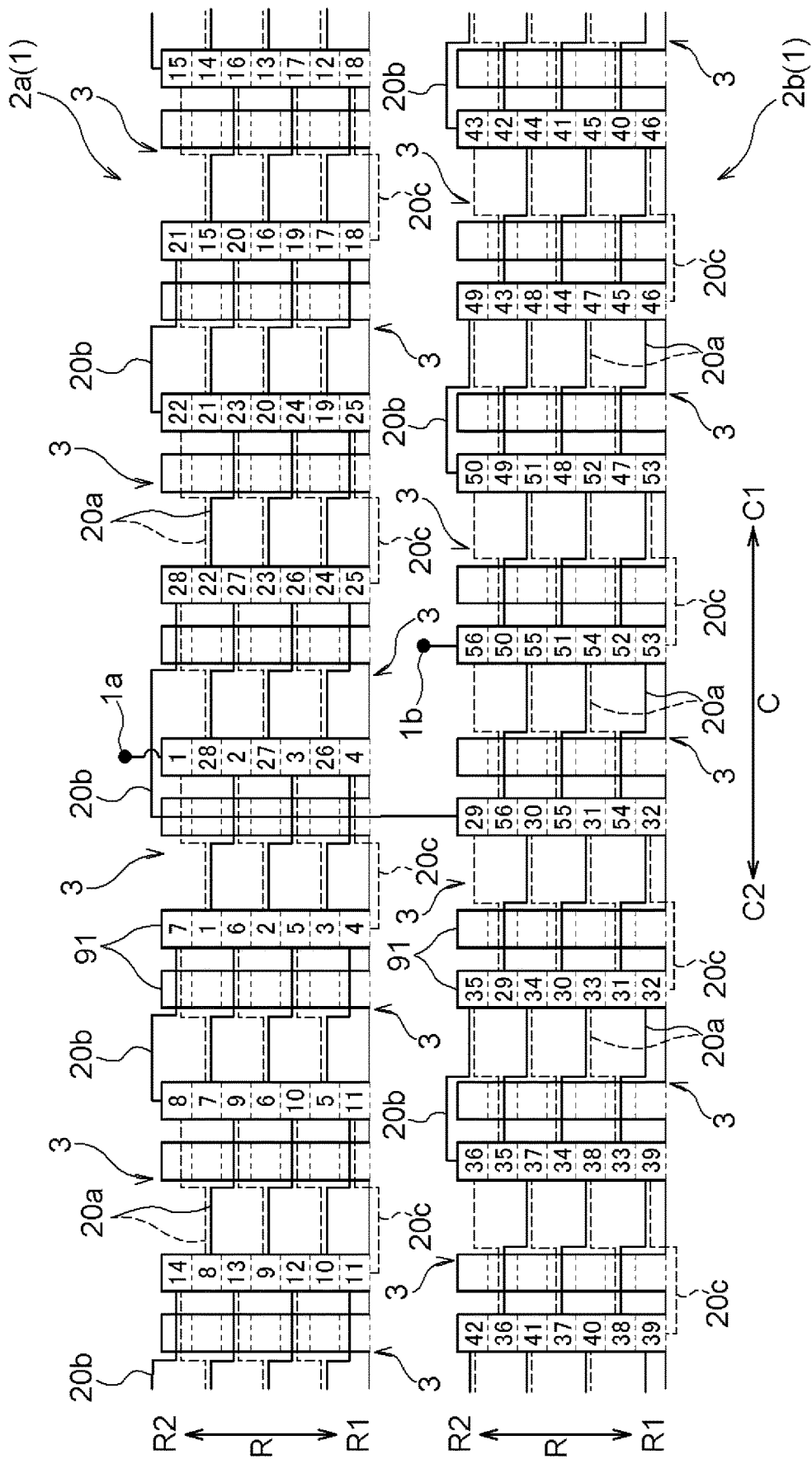
FIG. 8 is a diagram illustrating wiring of the coil according to the first embodiment.

As illustrated in FIG. 1, the plurality of crossover portions 20 of the coil 1 include the first crossover portions 20a, the second crossover portions 20b, and the third crossover portions 20c. As illustrated in FIGS. 1 and 8, the first crossover portions 20a are each a crossover portion 20 that connects between the first slot-housed portion 61 and the second slot-housed portion 62 which are disposed in layers that are adjacent to each other in the radial direction R, the second crossover portions 20*b* are each a crossover portion 20 that connects between the first slot-housed portion 61 and the second slot-housed portion 62 which are disposed in the layer (outermost layer) on the outermost side in the radial direction R (most on the radially outer side R2), and the third crossover portions 20*c* are each a crossover portion 20 that connects between the first slot-housed portion 61 and the second slot-housed portion 62 which are disposed in the layer (innermost layer) on the innermost side in the radial direction R (most on the radially inner side R1). FIG. 8 is a diagram illustrating wiring of the coil 1 (one phase coil) illustrated in FIG. 1, and the numerals given inside the slots 91 are identification numbers sequentially given to the respective pairs of slot-housed portions 60 along the path of a current between one end (first end portion 1*a*) and the other end (second end portion 1*b*) of the coil 1, the identification numbers starting with "1" on the first end portion 1*a* side. As discussed later, the coil 1 is constituted by electrically connecting (here, connecting in series) a first coil portion 2*a* and a second coil portion 2*b* to each other. In FIG. 8, in order to facilitate understanding of the wiring configuration of the coil 1, the wiring diagram of the first coil portion 2*a* and the wiring diagram of the second coil portion 2*b* are illustrated as shifted from each other. That is, two slots 91 arranged side by side in the up-down direction in FIG. 8 (up-down direction with FIG. 8 oriented such that the symbols indicated in FIG. 8 can be read) are an identical slot 91.

Here, if the side on which the third crossover portions 20*c* are disposed with respect to the core 90 in the axial direction L is defined as the first axial side L1, the second crossover portions 20*b* are disposed on the second axial side L2, which is the opposite side of the core 90 from the first axial side L1. That is, the third crossover portions 20*c* are disposed on the opposite side, in the axial direction L, of the core 90 from the side on which the second crossover portions 20*b* are disposed. In addition, some of the plurality of first crossover portions 20*a* (specifically, half of the first crossover portions 20*a*) of the coil 1 are disposed on the first axial side L1 with respect to the core 90, and the remaining first crossover portions 20*a* are disposed on the second axial side L2 with respect to the core 90. In FIG. 8, the crossover portions 20 (first crossover portions 20*a* and second crossover portions 20*b*) which are disposed on the second axial side L2 with respect to the core 90 are indicated by the solid line, and the crossover portions 20 (first crossover portions 20*a* and third crossover portions 20*c*) which are disposed on the first axial side L1 with respect to the core 90 are indicated by the broken line.

As illustrated in FIGS. 4 and 5, the first crossover portion 20*a* includes a portion (first portion 31) disposed at a position in the radial direction R corresponding to the first slot-housed portion 61, and a portion (second portion 32) disposed at a position in the radial direction R corresponding to the second slot-housed portion 62. The first portion 31 is disposed more toward a connection portion between the first crossover portion 20*a* and the first slot-housed portion 61 than the second portion 32 in the extension direction of the first crossover portion 20*a*. Here, the position in the radial direction R corresponding to the slot-housed portion 60 is the same position in the radial direction R as the slot-housed portion 60, or a different position in the radial direction R from the slot-housed portion 60. In the latter case, the position in the radial direction R corresponding to the slot-housed portion 60 which is disposed in the layer on the radially outer side R2, among the two slot-housed portions 60 which are disposed in layers that are adjacent to each other in the radial direction R, is set on the radially outer side R2 with respect to the position in the radial direction R corresponding to the slot-housed portion 60 which is disposed in the layer on the radially inner side R1. That is, if the position in the radial direction R corresponding to the slot-housed portion 60 is defined as a "corresponding radial position.", the order in which a plurality of corresponding radial positions are arranged in the radial direction R coincides with the order in which the corresponding slot-housed portions 60 are arranged in the radial direction R. In each of FIGS. 4 and 5 and FIGS. 6 and 7 to be referenced later, the respective shapes of the segment conductors 10 (a first segment conductor 10*a*, a second segment conductor 10*b*, and a third segment conductor 10*c* to be discussed later) which constitute the coil 1 as viewed in the radial direction R, the axial direction L, and the circumferential direction C are illustrated in the single drawing.

As illustrated in FIG. 4, the first crossover portion 20*a* which is disposed on the first axial side L1 with respect to the core 90 connects between the first slot-housed portion 61 and the second slot-housed portion 62 which is disposed in a layer adjacently on the radially inner side R1 with respect to the first slot-housed portion 61. Hence, in the first crossover portion 20*a* which is disposed on the first axial side L1 with respect to the core 90, the second portion 32 is disposed on the radially inner side R1 with respect to the first portion 31. As illustrated in FIG. 5, on the other hand, the first crossover portion 20*a* which is disposed on the second axial side 12 with respect to the core 90 connects between the first slot-housed portion 61 and the second slot-housed portion 62 which is disposed in a layer adjacently on the radially outer side R2 with respect to the first slot-housed portion 61. Hence, in the first crossover portion 20*a* which is disposed on the second axial side L2 with respect to the core 90, the second portion 32 is disposed on the radially outer side R2 with respect to the first portion 31. Thus, the second portion 32 of the first crossover portion 20*a* is disposed on the same side in the radial direction R as the first portion 31 of the first crossover portion 20*a* on each of both sides in the axial direction L with respect to the core 90. Consequently, the plurality of first crossover portions 20*a* which are disposed at the same position (region) in the radial direction R on the same side in the axial direction L with respect to the core 90 can be disposed such that the respective arrangement regions thereof in the circumferential direction C partially overlap each other while avoiding interference therebetween.

As illustrated in FIGS. 4 and 5, the first crossover portion 20*a* has a first offset portion 41 (bent portion) provided at the connection portion between the first portion 31 and the second portion 32 to offset (in the present embodiment, offset by one layer) the second portion 32 in the radial direction R with respect to the first portion 31. The first offset portion 41 is provided in order to avoid interference between the plurality of crossover portions 20 (here, the first crossover portions 20*a*) which are disposed at the same position in the radial direction R on the same side in the axial direction L with respect to the core 90. In the present embodiment, the first offset portion 41 which is provided on the first crossover portion 20*a* is formed at an intermediate portion (specifically, the middle portion), in the circumferential direction C, of the first crossover portion 20*a*. The first portion 31 is formed so as to extend arcuately as viewed in the axial direction L to connect between the first slot-housed portion 61 and the first offset portion 41, and the second portion 32 is formed so as to extend arcuately as viewed in the axial direction L to connect between the first offset portion 41 and the second slot-housed portion 62. A bent portion (first bent portion) is provided at the connection portion between the first portion 31 and the first slot-housed portion 61 to change the extension direction of the first portion 31 into a direction inclined in the circumferential direction C with respect to the extension direction of the first slot-housed portion 61. The second crossover portion 20b and the third crossover portion 20c are also provided with a similar bent portion (first bent portion). In addition, a bent portion (second bent portion) is provided at the connection portion between the second portion 32 and the second slot-housed portion 62 to change the extension direction of the second portion 32 into a direction inclined in the circumferential direction C with respect to the extension direction of the second slot-housed portion 62. A portion of the first crossover portion 20a that connects between the first bent portion and the second bent portion constitutes a circumferential extension portion 50 which is a portion of the first crossover portion 20a that extends in the circumferential direction C, In the present embodiment, the circumferential extension portion 50 of the first crossover portion 20a constitutes substantially the entirety of the first crossover portion 20a.

Figure 6:
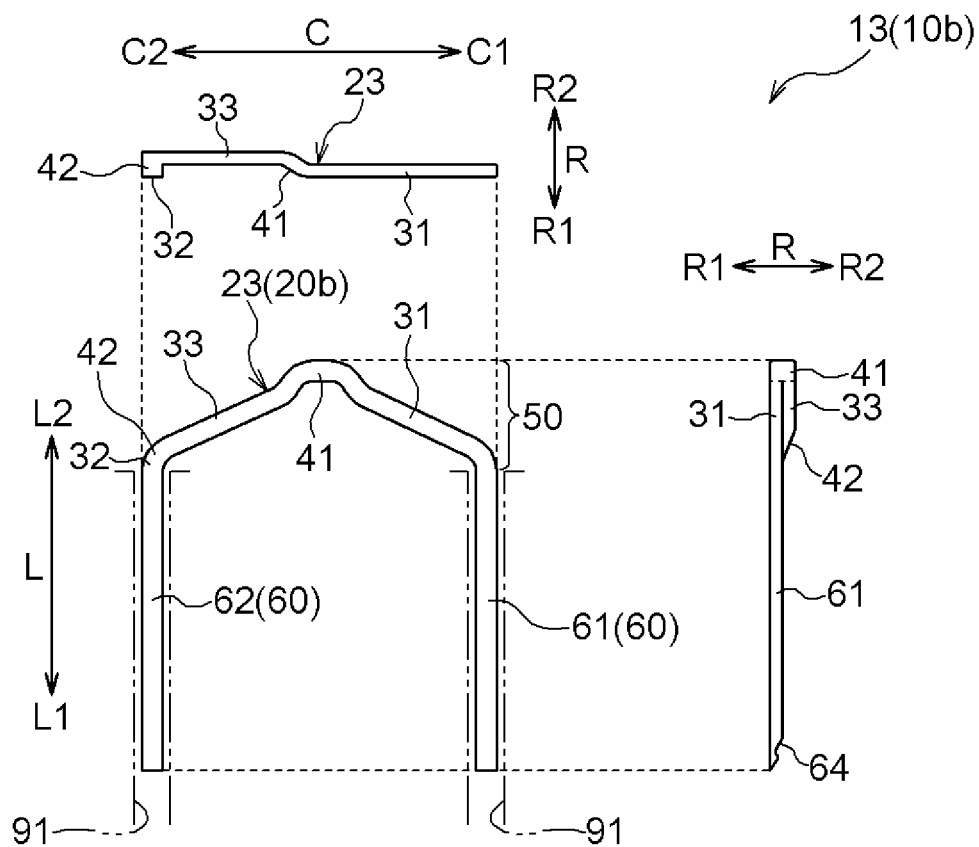
FIG. 6 illustrates a second segment conductor according to the first embodiment.

As illustrated in FIG. 6, the second crossover portion 20b includes a portion (first portion 31) disposed at a position in the radial direction R corresponding to the first slot-housed portion 61, an outside portion 33 disposed on the radially outer side R2 with respect to a position in the radial direction R corresponding to the first slot-housed portion 61 and a position in the radial direction R corresponding to the second slot-housed portion 62, and a portion (second portion 32) disposed at a position in the radial direction R corresponding to the second slot-housed portion 62. The first portion 31 is disposed more toward the connection portion between the second crossover portion 20b and the first slot-housed portion 61 than the outside portion 33 in the extension direction of the second crossover portion 20b. The second portion 32 is disposed more toward the connection portion between the second crossover portion 20b and the second slot-housed portion 62 than the outside portion 33 in the extension direction of the second crossover portion 20b. The second crossover portion 20b connects between the first slot-housed portion 61 and the second slot-housed portion 62 which are disposed in the layer most on the radially outer side R2 (i.e. connects between the first slot-housed portion 61 and the second slot-housed portion 62 which are disposed in an identical layer). Therefore, the position in the radial direction R corresponding to the first slot-housed portion 61 and the position in the radial direction R corresponding to the second slot-housed portion 62 are the same position in the radial direction R. That is, in the second crossover portion 20b, the first portion 31 and the second portion 32 are disposed at the same position in the radial direction R, and the outside portion 33 is disposed on the radially outer side R2 with respect to the first portion 31 and the second portion 32. With the second crossover portion 20b provided with the outside portion 33, it is possible to dispose the plurality of second crossover portions 20b such that the respective arrangement regions thereof in the circumferential direction C partially overlap each other while avoiding interference therebetween.

As illustrated in FIG. 6, the second crossover portion 20b has a first offset portion 41 (bent portion) which is provided at the connection portion between the first portion 31 and the outside portion 33 to offset (in the present embodiment, offset by one layer) the outside portion 33 toward the radially outer side R2 with respect to the first portion 31. The first offset portion 41 of the second crossover portion 20b is provided in order to avoid interference between the plurality of crossover portions 20 (here, the second crossover portions 20b) which are disposed at the same position in the radial direction R, as with the first offset portion 41 of the first crossover portion 20a. The second crossover portion 20b further has a second offset portion 42 (bent portion) provided at the connection portion between the outside portion 33 and the second portion 32 to offset (in the present embodiment, offset by one layer) the outside portion 33 toward the radially outer side R2 with respect to the second portion 32 (see FIG. 3).

In the present embodiment, the first offset portion 41 of the second crossover portion 20b is formed at an intermediate portion (specifically, the middle portion), in the circumferential direction C, of the second crossover portion 20b. Hence, the first portion 31 is formed so as to extend arcuately as viewed in the axial direction L to connect between the first slot-housed portion 61 and the first offset portion 41. In the present embodiment, ire addition, the second offset portion 42 is formed at an end portion of the second crossover portion 20b on the second circumferential side C2. Hence, the outside portion 33 is formed so as to extend arcuately as viewed in the axial direction L to connect between the first offset portion 41 and the second offset portion 42, and the second portion 32 is formed so as to extend in the axial direction L (in the present embodiment, so as to extend in parallel with the axial direction L) to connect between the second slot-housed portion 62 and the second offset portion 42. In the present embodiment, the second offset portion 42 is formed to overlap a bent portion (second bent portion) that changes the extension direction of the outside portion 33 into a direction inclined in the circumferential direction C with respect to the extension direction of the second slot-housed portion 62 (i.e. so as to overlap the bent portion in the extension direction of the second crossover portion 20b). As discussed above, the second crossover portion 20b is provided with the first bent portion, and a portion of the second crossover portion 20b that connects between the first bent portion and the second bent portion constitutes a circumferential extension portion 50 which is a portion of the second crossover portion 20b that extends in the circumferential direction C. In the present embodiment, the circumferential extension portion 50 of the second crossover portion 20b constitutes substantially the entirety of the second crossover portion 20b.

Figure 7:
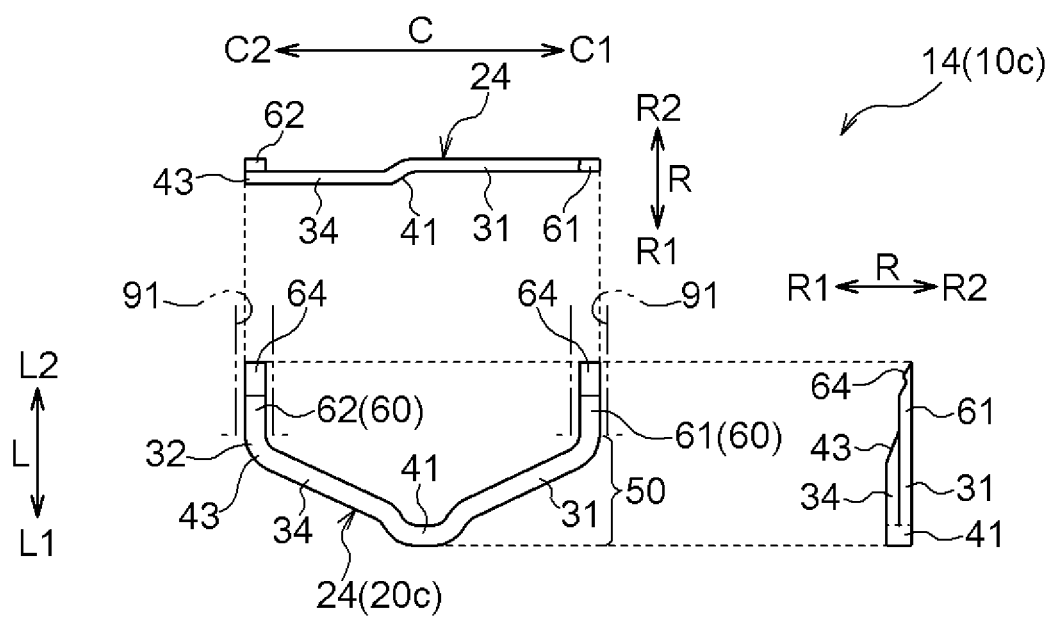
FIG. 7 illustrates a third segment conductor according to the first embodiment.

As illustrated in FIG. 7, the third crossover portion 20c includes a portion (first portion 31) disposed at a position in the radial direction R corresponding to the first slot-housed portion 61, an inside portion 34 disposed on the radially inner side R1 with respect to a position in the radial direction R corresponding to the first slot-housed portion 61 and a position in the radial direction R corresponding to the second slot-housed portion 62, and a portion (second portion 32) disposed at a position in the radial direction R corresponding to the second slot-housed portion 62. The first portion 31 is disposed more toward the connection portion between the third crossover portion 20c and the first slot-housed portion 61 than the inside portion 34 in the extension direction of the third crossover portion 20c. The second portion 32 is disposed more toward the connection portion between the third crossover portion 20c and the second slot-housed portion 62 than the inside portion 34 in the extension direction of the third crossover portion 20c. The third crossover portion 20c connects between the first slot-housed portion 61 and the second slot-housed portion 62 which are disposed in the layer most on the radially inner side R1 (i.e. connects between the first slot-housed portion 61 and the second slot-housed portion 62 which are disposed in an identical layer). Therefore, the position in the radial direction R corresponding to the first slot-housed portion 61 and the position in the radial direction R corresponding to the second slot-housed portion 62 are the same position in the radial direction R. That is, in the third crossover portion 20c, the first portion 31 and the second portion 32 are disposed at the same position in the radial direction R, and the inside portion 34 is disposed on the radially inner side R1 with respect to the first portion 31 and the second portion 32. With the third crossover portion 20c provided with the inside portion 34, it is possible to dispose the plurality of third crossover portions 20c such that the respective arrangement regions thereof in the circumferential direction C partially overlap each other while avoiding interference therebetween.

As illustrated in FIG. 7, the third crossover portion 20c has a first offset portion 41 (bent portion) which is provided at the connection portion between the first portion 31 and the inside portion 34 to offset (in the present embodiment, offset by one layer) the inside portion 34 toward the radially inner side R1 with respect to the first portion 31. The first offset portion 41 of the third crossover portion 20c is provided in order to avoid interference between the plurality of crossover portions 20 (here, the third crossover portions 20c) which are disposed at the same position in the radial direction R, as with the first offset portion 41 of the first crossover portion 20a and the first offset portion 41 of the second crossover portion 20b. The third crossover portion 20c further has a third offset portion 43 (bent portion) provided at the connection portion between the inside portion 34 and the second portion 32 to offset (in the present embodiment, offset by one layer) the inside portion 34 toward the radially inner side R1 with respect to the second portion 32 (see FIG. 3).

In the present embodiment, the first offset portion 41 of the third crossover portion 20c is formed at an intermediate portion (specifically, the middle portion), in the circumferential direction C, of the third crossover portion 20c. Hence, the first portion 31 is formed so as to extend arcuately as viewed in the axial direction L to connect between the first slot-housed portion 61 and the first offset portion 41. In the present embodiment, in addition, the third offset portion 43 is formed at an end portion of the third crossover portion 20c on the second circumferential side C2. Hence, the inside portion 34 is formed so as to extend arcuately as viewed in the axial direction L to connect between the first offset portion 41 and the third offset portion 43, and the second portion 32 is formed so as to extend in the axial direction L (in the present embodiment, so as to extend in parallel with the axial direction L) to connect between the second slot-housed portion 62 and the third offset portion 43. In the present embodiment, the third offset portion 43 is formed to overlap a bent portion (second bent portion) that changes the extension direction of the inside portion 34 into a direction inclined in the circumferential direction C with respect to the extension direction of the second slot-housed portion 62 (i.e. so as to overlap the bent portion in the extension direction of the third crossover portion 20c). As discussed above, the third crossover portion 20c is provided with the first bent portion, and a portion of the third crossover portion 20c that connects between the first bent portion and the second bent portion constitutes a circumferential extension portion 50 which is a portion of the third crossover portion 20c that extends in the circumferential direction C. In the present embodiment, the circumferential extension portion 50 of the third crossover portion 20c constitutes substantially the entirety of the third crossover portion 20c.

As illustrated in FIG. 1, the coil 1 is constituted by joining the first segment conductors 10a, the second segment conductors 10b, and the third segment conductors 10c to each other. In the present embodiment, as discussed above, each of the first segment conductors 10a, the second segment conductors 10b, and the third segment conductors 10c is a linear conductor with its cross section, orthogonal to the extension direction, having a rectangular shape. In FIG. 1, in order to facilitate understanding of the configuration of the coil 1, only the second segment conductors 10b and the third segment conductors 10c, among the first segment conductors 10a, the second segment conductors 10b, and the third segment conductors 10c, are hatched with different patterns. The same also applies to FIG. 3. The first segment conductors 10a are each a segment conductor 10 that has at least a part of the first crossover portion 20a. The second segment conductors 10b are each a segment conductor 10 that has at least the outside portion 33 of the second crossover portion 20b. The third segment conductors 10c are each a segment conductor 10 that has at least the inside portion 34 of the third crossover portion 20c.

The two crossover portions 20 to be connected are connected by the slot-housed portion 60. Hence, at least one of the two segment conductors 10 to be joined to each other includes the slot-housed portion 60. In order to enable the slot-housed portion 60 to be inserted into the slot 91 in the axial direction L, the segment conductor 10 which includes the slot-housed portion 60 includes two or less slot-housed portions 60 (i.e. one or two slot-housed portions 60). Here, the number of slot-housed portions 60 is an integer, and the slot-housed portion 60, the length of which in the axial direction L is less than the length of the slot 91 in the axial direction L, is also counted as one slot-housed portion 60. In the present embodiment, each of the first segment conductors 10a, the second segment conductors 10b, and the third segment conductors 10c has two or less slot-housed portions 60.

In the present embodiment, as illustrated in FIGS. 4 to 7, the first segment conductor 10a has the entire circumferential extension portion 50 which extends in the circumferential direction C in the first crossover portion 20a, the second segment conductor 10b has the entire circumferential extension portion 50 which extends in the circumferential direction C in the second crossover portion 20b, and the third segment conductor 10c has the entire circumferential extension portion 50 which extends in the circumferential direction C in the third crossover portion 20c. Here, the first segment conductor 10a has the entire first crossover portion 20a, the second segment conductor 10b has the entire second crossover portion 20b, and the third segment conductor 10c has the entire third crossover portion 20c. In the present embodiment, in addition, each of the first segment conductors 10a, the second segment conductors 10b, and the third segment conductors 10c has two slot-housed portions 60 (i.e. a first slot-housed portion 61 and a second slot-housed portion 62). That is, the first segment conductors 10a, the second segment conductors 10b, and the third segment conductors 10c are each formed in a U-shape as viewed in the radial direction R. In the present embodiment, in addition, the two slot-housed portions 60 of the first segment conductor 10a, the two slot-housed portions 60 of the second segment conductor 10b, and the two slot-housed portions 60 of the third segment conductor 10c are each a slot-housed portion 60, the length of which in the axial direction L is less than the length of the slot 91 in the axial direction L. Hence, the joint portion 64 to be joined to the slot-housed portion 60 of a different segment conductor 10 is formed at the distal end portion (an end portion on the opposite side from the connection portion with the crossover portion 20) of the slot-housed portion 60.

In the present embodiment, the coil 1 is formed using a first conductor 11 and a second conductor 12 as the first segment conductors 10a, using a third conductor 13 as the second segment conductors 10b, and using a fourth conductor 14 as the third segment conductors 10c. As illustrated in FIG. 4, the first conductor 11 is a first segment conductor 10a that has the circumferential extension portion 50 which is a first joint portion 21 (first crossover portion 20a) disposed on the first axial side L1 with respect to the core 90. As illustrated in FIG. 5, the second conductor 12 is a first segment conductor 10a that has the circumferential extension portion 50 which is a second joint portion 22 (first crossover portion 20a) disposed on the second axial side L2 with respect to the core 90. In addition, the third conductor 13 has the circumferential extension portion 50 which is a third connection portion 23 (second crossover portion 20b) disposed on the second axial side L2 with respect to the core 90, and the fourth conductor 14 has the circumferential extension portion 50 which is a fourth connection portion 24 (third crossover portion 20c) disposed on the first axial side L1 with respect to the core 90. Hence, in the present embodiment, the slot-housed portions 60 can be inserted into the slot 91 from the first axial side L1 with respect to the slot 91 for the first conductors 11 and the fourth conductors 14, and from the second axial side L2 with respect to the slot 91 for the second conductors 12 and the third conductors 13.

In the present embodiment, the coil 1 is wound around the core 90 by lap winding (coaxial winding). That is, as illustrated in FIG. 8, the coil 1 is formed by electrically connecting a plurality of lap wound portions 3 (coaxially wound portions) disposed side by side in the circumferential direction C. In the present example, as illustrated in FIGS. 1 and 8, the coil 1 (one phase coil) is constituted by electrically connecting (herein, connecting in series) the first coil portion 2a, which is formed by electrically connecting the plurality of lap wound portions 3 which are disposed side by side in the circumferential direction C, and the second coil portion 2b, which is formed by electrically connecting the plurality of lap wound portions 3 which are disposed side by side in the circumferential direction C. The plurality of lap wound portions 3 which constitute the first coil portion 2a and the plurality of lap wound portions 3 which constitute the second coil portion 2b are disposed as shifted by the arrangement pitch of the slots 91 (corresponding to one slot pitch) in the circumferential direction C.

As illustrated in FIGS. 1, 3, and 8, each turn of the lap wound portions 3 is formed by joining one first conductor 11 and one second conductor 12 which are disposed as shifted in position in the radial direction R at the same position in the circumferential direction C. The first conductor 11 and the second conductor 12 are joined to each other by joining the joint portion 64 (see FIG. 4) which is provided at the distal end portion of the second slot-housed portion 62 of the first conductor 11 and the joint portion 64 (see FIG. 5) which is provided at the distal end portion of the second slot-housed portion 62 of the second conductor 12 in the axial direction L in the slot 91. Consequently, the second slot-housed portion 62 of the first conductor 11 and the second slot-housed portion 62 of the second conductor 12 are joined to each other so as to extend linearly along the axial direction L to form the slot-housed portion 60 which extends in the axial direction L between both end portions of the slot 91 in the axial direction L. Thus, in the present embodiment, the first segment conductors 10a (specifically, the first conductor 11 and the second conductor 12) which are different from each other are joined to each other in the slot 91. The joint portions 64 can be joined to each other using a conductive joint material (such as a paste-like joint material containing silver nanoparticles), for example. The joint portions 64 may be joined to each other by welding or the like without using a joint material.

In the present embodiment, a plurality of sets (specifically, three sets) of one first conductor 11 and one second conductor 12 (first segment conductor sets) are disposed in each lap wound portion 3 as shifted in position in the radial direction R at the same position in the circumferential direction C. The joint portion 64 which is provided at the distal end portion of the first slot-housed portion 61 of the second conductor 12 which constitutes the first segment conductor set on the outer side in the radial direction R, of two first segment conductor sets disposed adjacent to each other in the radial direction R, and the joint portion 64 which is provided at the distal end portion of the first slot-housed portion 61 of the first conductor 11 which constitutes the first segment conductor set on the inner side in the radial direction R are joined to each other in the slot 91. That is, each lap wound portion 3 is formed by sequentially joining the first conductors 11 and the second conductors 12 which are disposed alternately in the radial direction R at the same position in the circumferential direction C.

As illustrated in FIGS. 1 and 8, the slot-housed portions 60 (first slot-housed portions 61), on the first circumferential side C1, of one lap wound portion 3 and the slot-housed portions 60 (second slot-housed portions 62), on the second circumferential side C2, of a different lap wound portion 3 are disposed alternately in the radial direction R inside each slot 91. That is, the first slot-housed portions 61 of one lap wound portion 3 are disposed side by side in one line such that a space (gap) corresponding to one layer is formed between the first slot-housed portions 61 which are adjacent to each other in the radial direction R, and the second slot-housed portions 62 of a different lap wound portion 3 are disposed in such gaps, respectively. In the present embodiment, as illustrated in FIG. 4, the pair of slot-housed portions 60 of the first conductor 11 are formed such that the first slot-housed portion 61 is shorter in the axial direction L than the second slot-housed portion 62, and correspondingly the pair of slot-housed portions 60 of the second conductor 12 are formed such that the first slot-housed portion 61 is longer in the axial direction L than the second slot-housed portion 62. Consequently, as illustrated in FIG. 3, the joint locations 63 (joint locations between the joint portions 64) which are adjacent to each other in the radial direction R in each slot 91 can be disposed as shifted in position in the axial direction L from each other, which makes it possible to simplify the process of insulating the joint locations 63.

As illustrated in FIGS. 1 and 8, the first segment conductor 10a (in the present embodiment, first conductor 11), which has the circumferential extension portion 50 of the first crossover portion 20a which is disposed on the first axial side L1 with respect to the core 90, and the second segment conductor 101) (in the present embodiment, the third conductor 13) are joined to each other. Specifically, the joint portion 64 (see FIG. 6) which is provided at the distal end portion of the first slot-housed portion 61 of the third conductor 13 and the joint portion 64 (see FIG. 4) which is provided at the distal end portion of the first slot-housed portion 61 of the first conductor 11 which is disposed most on the radially outer side R2 and which constitutes one lap wound portion 3 (the lap wound portion 3 which is disposed at the same position in the circumferential direction C as the third conductor 13) are joined to each other. In addition, the joint portion 64 (see FIG. 6) which is provided at the distal end portion of the second slot-housed portion 62 of the third conductor 13 and the joint portion 64 (see FIG. 4) which is provided at the distal end portion of the first slot-housed portion 61 of the first conductor 11 which is disposed most on the radially outer side R2 and which constitutes the lap wound portion 3 which is disposed on the second circumferential side C2 with respect to the above lap wound portion 3 are joined to each other. Consequently, one lap wound portion 3 and a different lap wound portion 3, the slot-housed portion 60 (first slot-housed portion 61) of which on the first circumferential side C1 is disposed in the slot 91 in which the slot-housed portion 60 (second slot-housed portion 62) of the one lap wound portion 3 on the second circumferential side C2 is disposed, are electrically connected to each other by the second segment conductor 1ab (third conductor 13). In the present embodiment, the first segment conductors 10a (first conductors 11) and the second segment conductors 10b (third conductors 13) are joined to each other in the slot 91 (see FIG. 3).

As illustrated in FIGS. 1 and 8, in addition, the first segment conductor 10a (in the present embodiment, second conductor 12), which has the circumferential extension portion 50 of the first crossover portion 20a which is disposed on the second axial side L2 with respect to the core 90, and the third segment conductor 10c (in the present embodiment, the fourth conductor 14) are joined to each other. Specifically, the joint portion 64 (see FIG. 7) which is provided at the distal end portion of the first slot-housed portion 61 of the fourth conductor 14 and the joint portion 64 (see FIG. 5) which is provided at the distal end portion of the first slot-housed portion 61 of the second conductor 12 which is disposed most on the radially inner side R1 and which constitutes one lap wound portion 3 (the lap wound portion 3 which is disposed at the same position in the circumferential direction C as the third conductor 13) are joined to each other. In addition, the joint portion 64 (see FIG. 7) which is provided at the distal end portion of the second slot-housed portion 62 of the fourth conductor 14 and the joint portion 64 (see FIG. 5) which is provided at the distal end portion of the first slot-housed portion 61 of the second conductor 12 which is disposed most on the radially inner side R1 and which constitutes the lap wound portion 3 which is disposed on the second circumferential side C2 with respect to the above lap wound portion 3 are joined to each other. Consequently, one lap wound portion 3 and a different lap wound portion 3, the slot-housed portion 60 (first slot-housed portion 61) of which on the first circumferential side C1 is disposed in the slot 91 in which the slot-housed portion 60 (second slot-housed portion 62) of the one lap wound portion 3 on the second circumferential side C2 is disposed, are electrically connected to each other by the third segment conductor 10c (fourth conductor 14). In the present embodiment, the first segment conductors 10a (second conductors 12) and the third segment conductors 10c (fourth conductors 14) are joined to each other in the slot 91 (see FIG. 3).

As discussed above, the second crossover portion 20b and the third crossover portion 20c are disposed on the opposite sides in the axial direction L from each other with respect to the core 90. Consequently, the coil 1 can be wound around the core 90 such that the slot-housed portions 60 which are disposed in an identical layer can be connected to each other using only one of the second crossover portion 20b and the third crossover portion 20c for each pair of slots 91 in which the pair of slot-housed portions 60 which are connected to each other by the first crossover portion 20a are disposed. That is, as illustrated in FIG. 8, the plurality of lap wound portions 3 which are arranged side by side in the circumferential direction C in the first coil portion 2a or the second coil portion 2b are sequentially electrically connected to each other using the second crossover portion 20b and the third crossover portion 20c alternately. Consequently, it is possible to achieve a coil 1 in which the number of slot-housed portions 60 disposed side by side in the radial direction R in each slot 91 is an odd number (an odd number of three or more, and seven in the present embodiment).

In the present embodiment, the crossover portions 20 are provided so as to connect between the pair of slot-housed portions 60 which are disposed six tithes the arrangement pitch of the slots 91 (corresponding to six slot pitches) a way from each other in the circumferential direction C. As illustrated in FIG. 8, however, only the crossover portions 20 (second crossover portions 20b) which connect between the first coil portion 2a and the second coil portion 2b connect between the pair of slot-housed portions 60 which are disposed seven times the arrangement pitch of the slots 91 (corresponding to seven slot pitches) away from each other in the circumferential direction C.

In the present embodiment, as illustrated in FIG. 1, the coil 1 includes an eighth conductor 18 and a ninth conductor 19, in addition to the first conductors 11, the second conductors 12, the third conductors 13, and the fourth conductors 14 discussed above. The eighth conductor 18 is a segment conductor 10 that has a single slot-housed portion 60, and an end portion of the eighth conductor 18 on the opposite side from the connection portion with the first conductor 11 constitutes the first end portion 1a which is one end of the coil 1 (phase coil). Meanwhile, the ninth conductor 19 is a segment conductor 10 that has a single slot-housed portion 60, and an end portion of the ninth conductor 19 on the opposite side from the connection portion with the first conductor 11 constitutes the second end portion 1b which is the other end of the coil 1 (phase coil). In the case where the plurality of phase coils are connected to each other through a star connection, one of the first end portion 1a and the second end portion 1b is connected to a power line terminal to which a power line is connected, and the other of the first end portion 1a and the second end portion 1b is connected to a neutral point. In the case where the plurality of phase coils are connected to each other through a delta connection, meanwhile, both the first end portion 1a and the second end portion 1b are connected to different power line terminals.

Second Embodiment

A coil according to a second embodiment will be described with reference to FIGS. 9 to 11. Differences of the coil according to the present embodiment from that according to the first embodiment will be mainly described below. Elements that are not specifically described are the same as those according to the first embodiment, and are given the same reference numerals to omit a detailed description. The configurations of the segment conductors 10 described in relation to the above first embodiment and the second embodiment are merely exemplary. The locations at which the coil 1 is divided into the plurality of segment conductors 10 are changeable as appropriate, and the configurations of the segment conductors 10 are also changeable accordingly.

In the present embodiment, each of the segment conductors 10 which include the first segment conductor 10a, the second segment conductor 10b, and the third segment conductor 10c has: two slot-housed portions 60 (a first slot-housed portion 61 and a second slot-housed portion 62); a crossover portion 20 disposed on the first axial side L1, which is one side in the axial direction L, with respect to the core 90 to connect between the two slot-housed portions 60; and extending portions 70 that respectively extend from the two slot-housed portions 60 to be disposed on the second axial side L2, which is the opposite side of the core 90 from the first axial side L1. If the extending portion 70 which extends from the first slot-housed portion 61 is defined as a first extending portion 71 and the extending portion 70 which extends from the second slot-housed portion 62 is defined as a second extending portion 72, the first extending portion 71 has, at the distal end portion (an end portion on the opposite side from the connection portion with the first slot-housed portion 61) thereof, a first joint portion 71a to be joined to the extending portion 70 of a different segment conductor 10, and the second extending portion 72 has, at the distal end portion (an end portion on the opposite side from the connection portion with the second slot-housed portion 62) thereof, a second joint portion 72a to be joined to the extending portion 70 of a different segment conductor 10.

Figure 9:
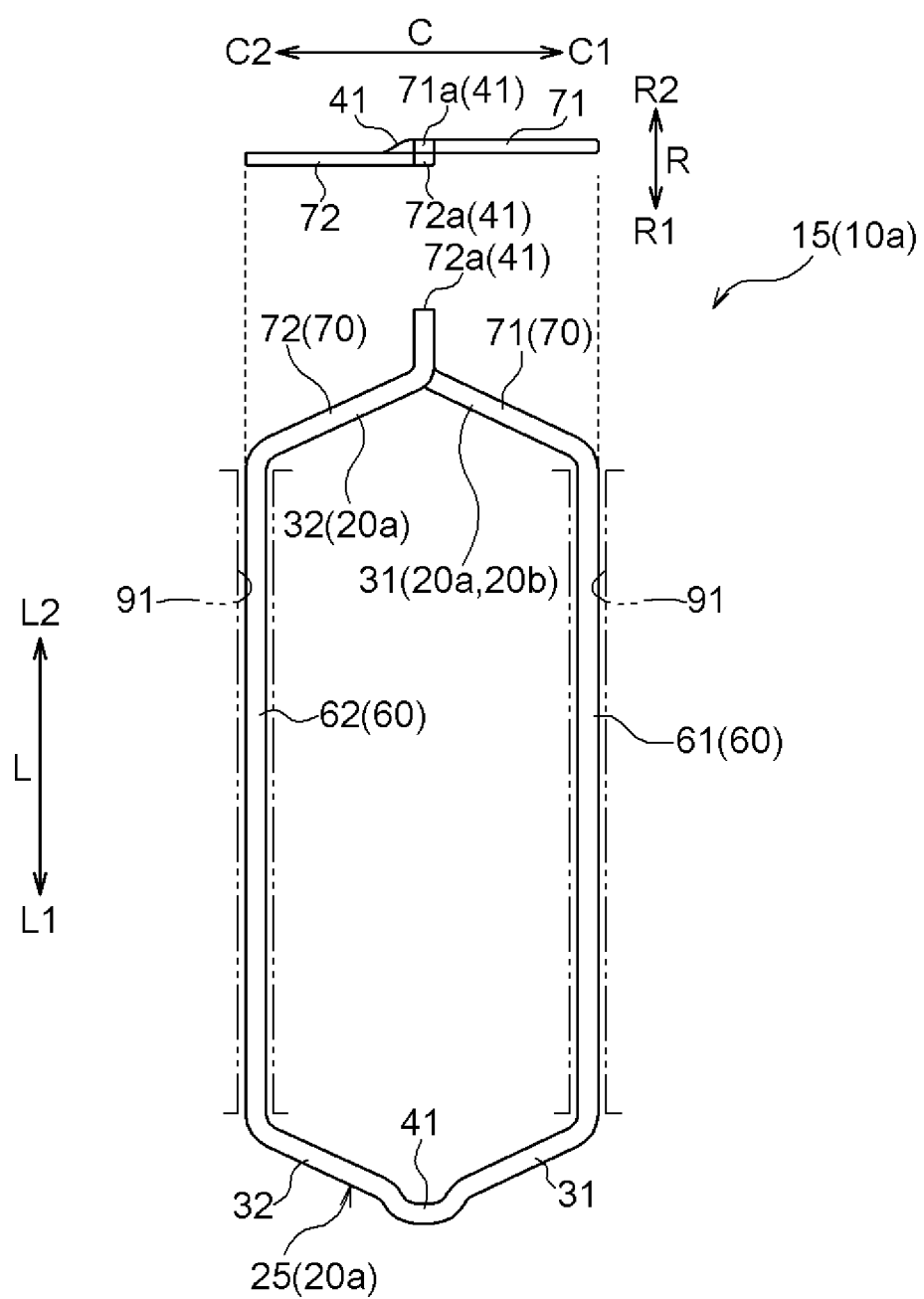
FIG. 9 illustrates a first segment conductor according to a second embodiment.
Figure 10:
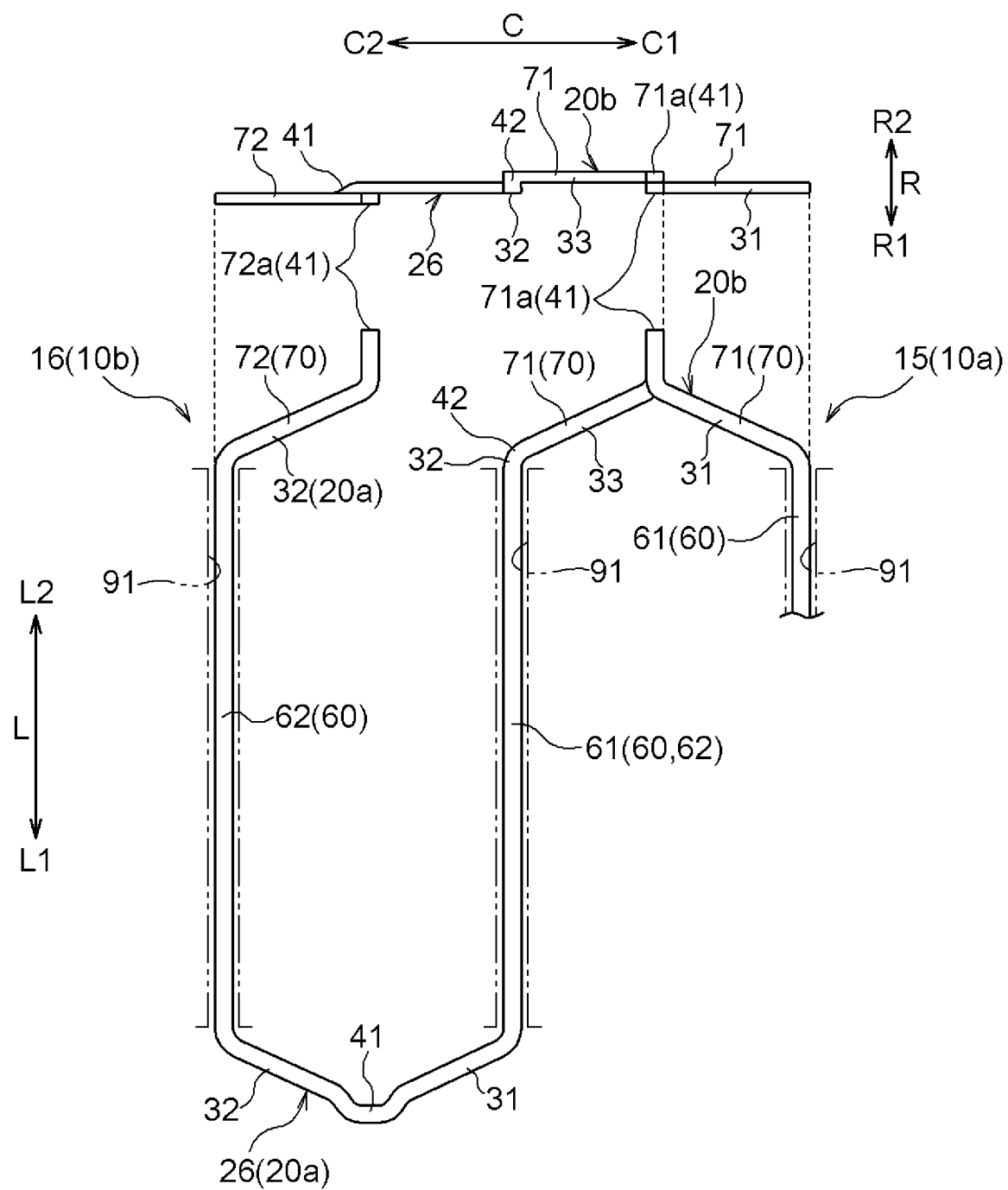
FIG. 10 illustrates a second segment conductor according to the second embodiment.
Figure 11:
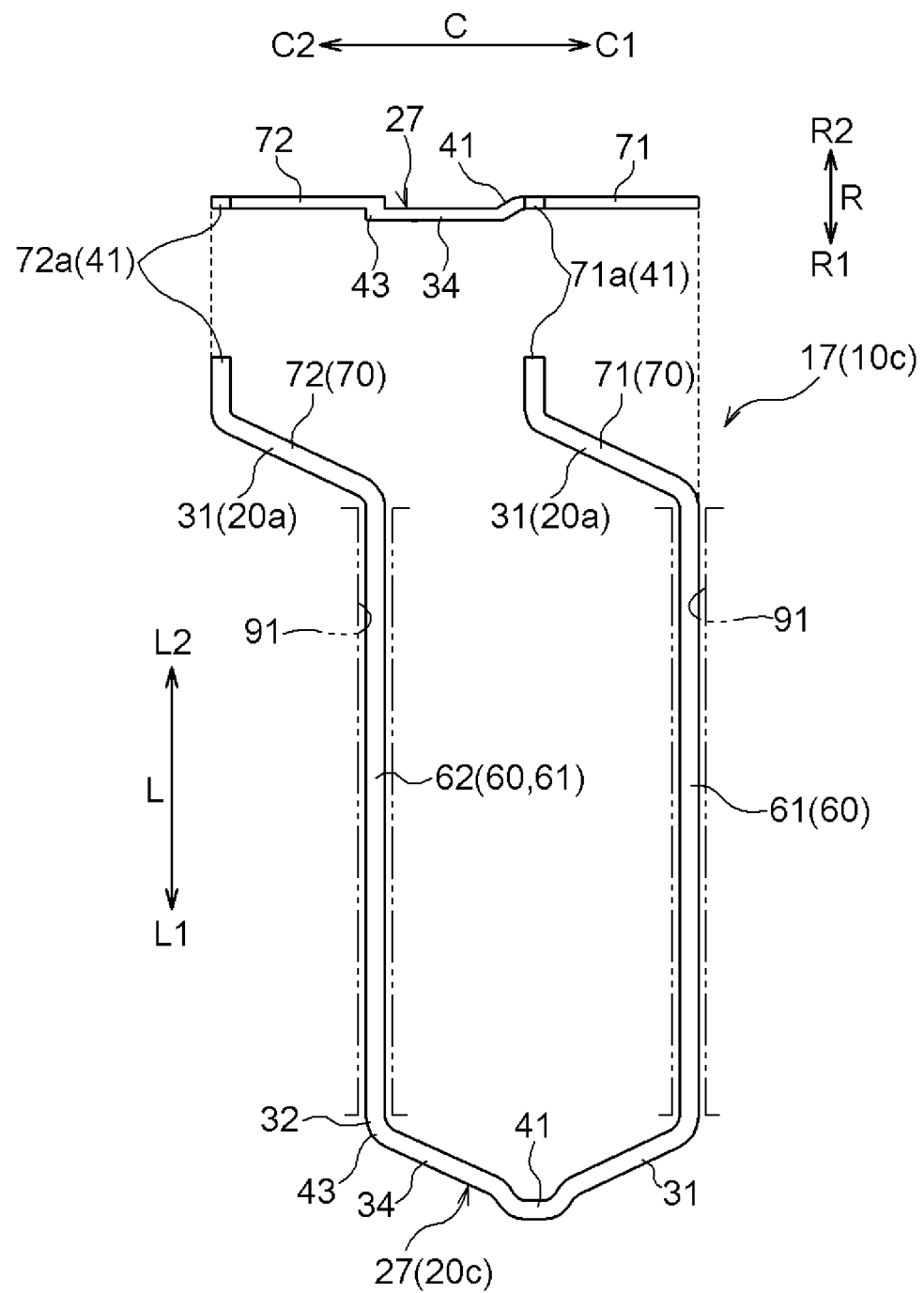
FIG. 11 illustrates a third segment conductor according to the second embodiment.

Specifically, the coil 1 according to the present embodiment is formed using a fifth conductor 15 illustrated in FIG. 9 as the first segment conductors 10a, using a sixth conductor 16 illustrated in FIG. 10 as the second segment conductors 10b, and using a seventh conductor 17 illustrated in FIG. 11 as the third segment conductors 10c. As illustrated in FIGS. 9 and 10, each of the fifth conductor 15 and the sixth conductor 16 has: a first crossover portion 20a disposed on the first axial side L1 with respect to the core 90; a pair of slot-housed portions 60 (a first slot-housed portion 61 and a second slot-housed portion 62) connected to each other by the first crossover portion 20a; and a pair of extending portions 70 (a first extending portion 71 and a second extending portion 72) disposed on the second axial side with respect to the core 90. That is, the fifth conductor 15 has a fifth connection portion 25 (first crossover portion 20a) disposed on the first axial side L1 with respect to the core 90, and the sixth conductor 16 has a sixth connection portion 26 (first crossover portion 20a) disposed on the first axial side L1 with respect to the core 90. A bent portion (circumferential bent portion) is provided at the connection portion between the first extending portion 71 and the first slot-housed portion 61 to change the extension direction of the first extending portion 71 into a direction inclined in the circumferential direction C with respect to the extension direction of the first slot-housed portion 61. A bent portion (circumferential bent portion) is provided at the connection portion between the second extending portion 72 and the second slot-housed portion 62 to change the extension direction of the second extending portion 72 into a direction inclined in the circumferential direction C with respect to the extension direction of the second slot-housed portion 62. The fifth conductor 15 and the sixth conductor 16 are shaped such that the slot-housed portions 60 are insertable into the slots 91 in the axial direction L in a state in which both the first extending portion 71 and the second extending portion 72 are formed so as to extend in parallel with the slot-housed portions 60 (i.e. a state before the two circumferential bent portions are formed).

As illustrated in FIG. 9, the first extending portion 71 of the fifth conductor 15 is formed so as to be inclined toward the second circumferential side C2 with respect to the extension direction of the first slot-housed portion 61, so as to extend gradually away from the core 90 toward the second circumferential side C2. As illustrated in FIG. 10, meanwhile, the first extending portion 71 of the sixth conductor 16 is formed so as to be inclined toward the first circumferential side C1 with respect to the extension direction of the first slot-housed portion 61, so as to extend gradually away from the core 90 toward the first circumferential side C1. As illustrated in FIGS. 9 and 10, in addition, both the second extending portion 72 of the fifth conductor 15 and the second extending portion 72 of the sixth conductor 16 are formed so as to be inclined toward the first circumferential side C1 with respect to the extension direction of the second slot-housed portion 62, so as to extend gradually away from the core 90 toward the first circumferential side C1.

As illustrated in FIG. 11, the seventh conductor 17 has: a seventh connection portion 27 (third crossover portion 20c) disposed on the first axial side L1 with respect to the core 90; a pair of slot-housed portions 60 (a first slot-housed portion 61 and a second slot-housed portion 62) connected to each other by the third crossover portion 20c; and a pair of extending portions 70 (a first extending portion 71 and a second extending portion 72) disposed on the second axial side with respect to the core 90. A bent portion (circumferential bent portion) is provided at the connection portion between the first extending portion 71 and the first slot-housed portion 61 to change the extension direction of the first extending portion 71 into a direction inclined in the circumferential direction C with respect to the extension direction of the first slot-housed portion 61. A bent portion (circumferential bent portion) is provided at the connection portion between the second extending portion 72 and the second slot-housed portion 62 to change the extension direction of the second extending portion 72 into a direction inclined in the circumferential direction C with respect to the extension direction of the second slat-housed portion 62. The seventh conductor 17 is shaped such that the slot-housed portions 60 are insertable into the slots 91 in the axial direction L in a state in which bath the first extending portion 71 and the second extending portion 72 are formed so as to extend in parallel with the slot-housed portions 60 (i.e. a state before the two circumferential bent portions are formed).

As illustrated in FIG. 11, the first extending portion 71 of the seventh conductor 17 is formed so as to be inclined toward the second circumferential side C2 with respect to the extension direction of the first slot-housed portion 61, so as to extend gradually away from the core 90 toward the second circumferential side C2. Meanwhile, the second extending portion 72 of the seventh conductor 17 is formed so as to be inclined toward the second circumferential side C2 with respect to the extension direction of the second skit-housed portion 62, so as to extend gradually away from the core 90 toward the second circumferential side C2.

Since the coil 1 according to the present embodiment is formed using the fifth conductors 15, the sixth conductors 16, and the seventh conductors 17 configured as described above, the first crossover portion 20a and the third crossover portion 20c which are disposed on the first axial side L1 with respect to the core 90 are configured such that the entire crossover portion 20 is included in one segment conductor 10, as in the first embodiment described above. That is, the entire first crossover portion 20a is included in the fifth conductor 15 (first segment conductor 10a) or the sixth conductor 16 (second segment conductor 10b), and the entire third crossover portion 20c is included in the seventh conductor 17 (third segment conductor 10c). Thus, in the present embodiment, as in the first embodiment described above, the first segment conductor 10a has the entire first crossover portion 20a, and the third segment conductor 10c has the entire third crossover portion 20c. Unlike the first embodiment described above, however, the second segment conductor 10b has only a part of the second crossover portion 20b including the outside portion 33 as discussed below.

In the coil 1 according to the present embodiment, the crossover portion 20 which is disposed on the second axial side L2 with respect to the core 90 is configured such that the entire crossover portion 20 is not included in one segment conductor 10, and formed by joining the respective extending portions 70 of different segment conductors 10 to each other. Specifically, the first crossover portion 20a which is disposed on the second axial side L2 with respect to the core 90 is formed by the first extending portion 71 of the fifth conductor 15 and the second extending portion 72 of a different fifth conductor 15 by joining the first extending portion 71 and the second extending portion 72 to each other. That is, the first extending portion 71 of the fifth conductor 15 corresponds to the first portion 31 of the first crossover portion 20a, and the second extending portion 72 of the fifth conductor 15 corresponds to the second portion 32 of the first crossover portion 20a (see FIG. 9). In addition, the joint portion between the extending portions 70 form the first offset portion 41 to offset (in the present embodiment, offset by one layer) one of the extending portions 70 (first portion 31) and the other extending portion 70 (second portion 32) in the radial direction R. Further, the first crossover portion 20a which is disposed on the second axial side L2 with respect to the core 90 is formed by the first extending portion 71 (see FIG. 9) of the fifth conductor 15 and the second extending portion 72 (see FIG. 10) of the sixth conductor 16 by joining the first extending portion 71 and the second extending portion 72 to each other. That is, the second extending portion 72 of the sixth conductor 16 corresponds to the second portion 32 of the first crossover portion 20a.

In addition, the first crossover portion 20a which is disposed on the second axial side L2 with respect to the core 90 is formed by the second extending portion 72 (see FIG. 9) of the fifth conductor 15 and the first extending portion 71 (see FIG. 11) of the seventh conductor 17 by joining the second extending portion 72 and the first extending portion 71 to each other. That is, the first extending portion 71 of the seventh conductor 17 corresponds to the first portion 31 of the first crossover portion 20a. Further, the first crossover portion 20a which is disposed on the second axial side L2 with respect to the core 90 is formed by the second extending portion 72 (see FIG. 9) of the fifth conductor 15 and the second extending portion 72 (see FIG. 11) of the seventh conductor 17 by joining the two second extending portions 72 to each other. That is, as with the first extending portion 71 of the seventh conductor 17, the second extending portion 72 of the seventh conductor 17 corresponds to the first portion 31 of the first crossover portion 20a. With focus on the first crossover portion 20a which is formed in this manner by, oining the second extending portion 72 of the fifth conductor 15 and the second extending portion 72 of the seventh conductor 17 to each other, the second slot-housed portion 62 of the seventh conductor 17 corresponds to the first slot-housed portion 61 from the viewpoint of being the slot-housed portion 60 which is disposed on the first circumferential side C1, of the pair of slot-housed portions 60 which are connected to each other by the first crossover portion 20a.

Further, the second crossover portion 20b is formed by the first extending portion 71 (see FIG. 9) of the fifth conductor 15 and the first extending portion 71 (see FIG. 10) of the sixth conductor 16 by joining the two first extending portions 71 to each other. That is, the first extending portion 71 of the sixth conductor 16 corresponds to the outside portion 33 of the second crossover portion 20b. In the second embodiment, unlike the first embodiment described above, the second segment conductor 10b (sixth conductor 16) includes the outside portion 33 and the second portion 32 of the second crossover portion 20b, but does not include the first portion 31 of the second crossover portion 20b. In this case, the first extending portion 71 of the fifth conductor 15 corresponds to the first portion 31 of the second crossover portion 20b. With focus on the second crossover portion 20b which is formed in this manner, the first slot-housed portion 61 of the sixth conductor 16 corresponds to the second slot-housed portion 62 from the viewpoint of being the slot-housed portion 60 which is disposed on the second circumferential side C2, of the pair of slot-housed portions 60 which are connected to each other by the second crossover portion 20b. In the second embodiment, as described above, the entire third crossover portion 20c is included in the third segment conductor 10c (seventh conductor 17), and the second crossover portion 20b is formed by joining the extending portion 70 of the first segment conductor 10a (fifth conductor 15) and the extending portion 70 of e second segment conductor 10b (sixth conductor 16) to each other.

Third Embodiment

A coil according to a third embodiment will be described with reference to FIGS. 12 to 15. Differences of the coil according to the present embodiment from that according to the first embodiment will be mainly described below. Elements that are not specifically described are the same as those according to the first embodiment, and are given the same reference numerals to omit a detailed description.

The coil 1 according to the present embodiment is formed using a first conductor 11 and a second conductor 12 as the first segment conductors 10a, using a third conductor 13 as the second segment conductors 10b, and using a fourth conductor 14 as the third segment conductors 10c, as in the first embodiment described above. As is clear from a comparison between FIGS. 12 to 15 and FIGS. 4 to 7, however, the configuration of the first conductor 11, the second conductor 12, the third conductor 13, and the fourth conductor 14 is different between the present embodiment and the first embodiment.

Figure 14:
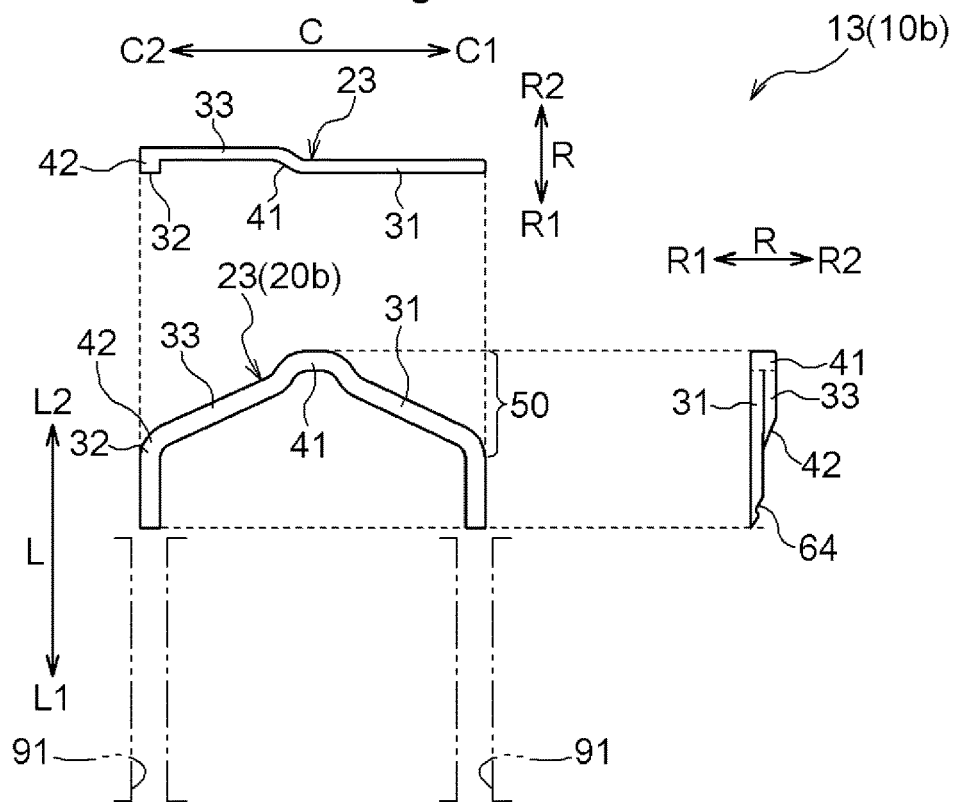
FIG. 14 illustrates a second segment conductor according to the third embodiment.

In the present embodiment, only some of the segment conductors 10, among the plurality of segment conductors 10 including the first segment conductor 10a, the second segment conductor 10b, and the third segment conductor 10c, have the slot-housed portions 60. Specifically, the first conductor 11 as the first segment conductor 10a and the fourth conductor 14 as the third segment conductor 10c include two or less slot-housed portions 60 (here, two slot-housed portions 60) as illustrated in FIGS. 13 and 14, and the second conductor 12 as the first segment conductor 10a and the third conductor 13 as the second segment conductor 10b do not include the slot-housed portions 60.

Figure 15:
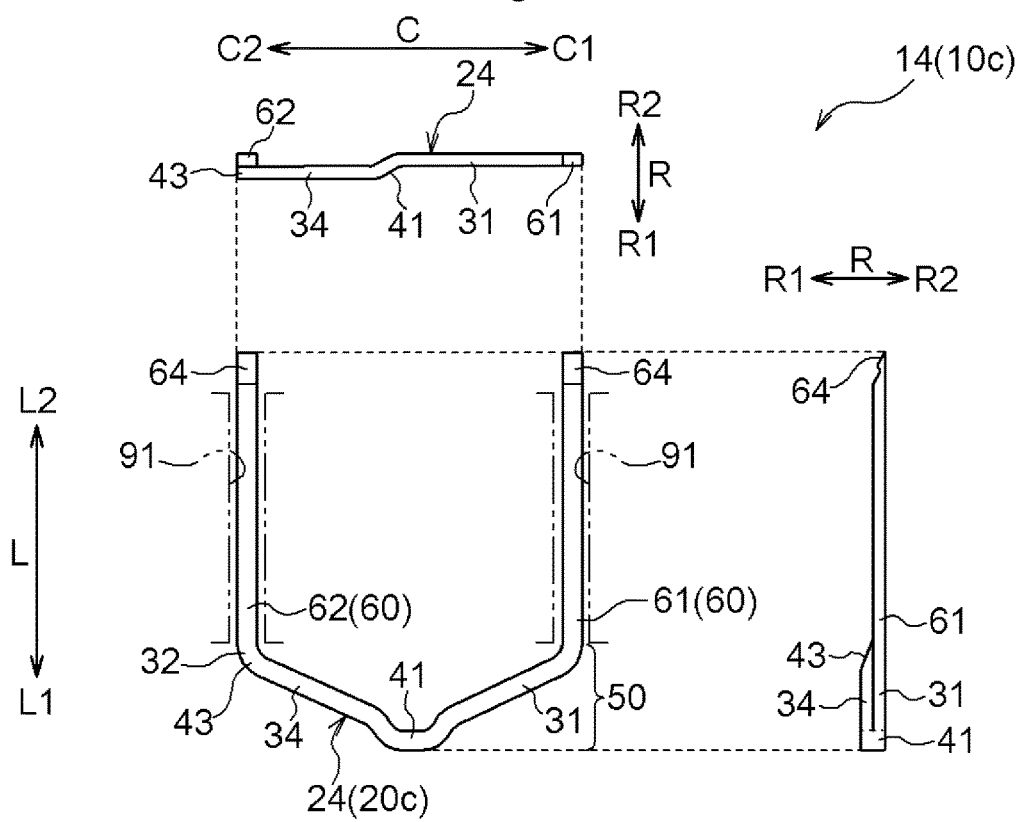
FIG. 15 illustrates a third segment conductor according to the third embodiment.

In the present embodiment, as illustrated in FIGS. 12 and 15, the segment conductors 10 (the first conductor 11 and the fourth conductor 14) which include the slot-housed portions 60 each include extending portions that extend from the respective slot-housed portions 60 to be disposed on the opposite side (second axial side L2), in the axial direction L, of the core 90 from the crossover portion 20 (crossover portion 20 of the segment conductor 10), and the extending portions (i.e. portions disposed outside the slots 91) are formed with respective joint portions 64 to be joined to different segment conductors 10. The segment conductors 10 which include the slot-housed portions 60 each include two extending portions corresponding to two slot-housed portions 60, and the two extending portions are formed with the respective joint portions 64. The two extending portions are formed to be equal in the length in the axial direction L to each other.

On the other hand, the segment conductors 10 (the second conductor 12 and the third conductor 13) which do not include the slot-housed portions 60 each have the entirety or a part of the crossover portion 20. In the present embodiment, as illustrated in FIGS. 13 and 14, the segment conductors 10 have a part of the crossover portion 20 (a portion including the entire circumferential extension portion 50). A portion of the crossover portion 20 not included in the segment conductor 10 is constituted by the extending portion of a different segment conductor 10 to which the segment conductor 10 is joined. Both end portions, in the extension direction of the segment conductors 10, of the segment conductors 10 which do not include the slot-housed portions 60 are disposed outside the slots 91 (outer side in the axial direction L with respect to the core 90), and formed with the respective joint portions 64 to be joined to different segment conductors 10.

In the present embodiment, since the segment conductors 10 are formed as described above, the first segment conductors 10a (specifically, the first conductor 11 and the second conductor 12) which are different from each other are joined to each other outside the slot 91, rather than in the slot 91, that is, on the outer side in the axial direction L with respect to the core 90. Similarly, the first segment conductor 10a (first conductor 11) and the second segment conductor 10b (third conductor 13) are joined to each other on the outer side in the axial direction L with respect to the core 90, and the first segment conductor 10a (second conductor 12) and the third segment conductor 10c (fourth conductor 14) are joined to each other on the outer side in the axial direction L with respect to the core 90. In the present embodiment, the first segment conductors 10a (the first conductor 11 and the second conductor 12) which are different from each other are joined to each other, the first segment conductor 10a (first conductor 11) and the second segment conductor 10b (third conductor 13) are joined to each other, and further the first segment conductor 10a (second conductor 12) and the third segment conductor 10c, (fourth conductor 14) are joined to each other on the same side (second axial side L2) in the axial direction L with respect to the core 90.

Other Embodiments

Next, coils according to other embodiments will be described.

(1) In the second embodiment described above, the entire third crossover portion 20c is included in the third segment conductor 10c, and the second crossover portion 20b is formed by joining the extending portion 70 of the first segment conductor 10a and the extending portion 70 of the second segment conductor 101) to each other. However, the present disclosure is not limited to such a configuration. The entire second crossover portion 20b may be included in the second segment conductor 10b, and the third crossover portion 20c may be formed by joining the extending portion 70 of the first segment conductor 10a and the extending portion 70 of the third segment conductor 10c to each other. Specifically, unlike the second embodiment described above, the side on which the second crossover portion 20b is disposed with respect to the core 90 in the axial direction L may be defined as the first axial side L1, the entire second crossover portion 20b may be included in the second segment conductor 10b, and only a part of the third crossover portion 20c including the inside portion 34 may be included in the third segment conductor 10c.

(2) In the first and second embodiments described above, each of the first segment conductors 10a, the second segment conductors 10b, and the third segment conductors 10c has two slot-housed portions 60. However, the present disclosure is not limited to such a configuration. At least one of the segment conductors 10, among the first segment conductor 10a, the second segment conductor 10b, and the third segment conductor 10c, may have only one slot-housed portion 60 (e.g. the segment conductor 10 is formed in a J-shape as viewed in the radial direction R).

(3) In the first embodiment described above, the first segment conductors 10a which are different from each other are joined to each other in the slot 91, the first segment conductor 10a and the second segment conductor 10b are joined to each other in the slot 91, and further the first segment conductor 10a and the third segment conductor 10c are joined to each other in the slot 91. However, the present disclosure is not limited to such a configuration. At least one of the joint location 63 between the first segment conductors 10a which are different from each other, the joint location 63 between the first segment conductor 10a and the second segment conductor 10b, and the joint location 63 between the first segment conductor 10a and the third segment conductor 10c may be disposed on the outer side in the axial direction L with respect to the ore 90.

(4) In the first to third embodiments described above, the core 90 is a stator core for use in a rotary electric machine of an inner rotor type, and each of the slots 91 has an opening portion on the radially inner side R1. However, the present disclosure is not limited to such a configuration. The core 90 may be a stator core for use in a rotary electric machine of an outer rotor type, and each of the slots 91 may have an opening portion on the radially outer side R2.

(5) In the first to third embodiments described above, the slots 91 are formed so as to extend in parallel with the axial direction L. However, the present disclosure is not limited to such a configuration. The entirety or a part of each of the slots 91 may extend in a direction inclined with respect to the axial direction L.

(6) In the first to third embodiments described above, a linear conductor with its cross section, orthogonal to the extension direction, having a rectangular shape, is used as a segment conductor that constitutes the segment conductors 10. However, the present disclosure is not limited to such a configuration. A linear conductor with its cross section, orthogonal to the extension direction, having a shape (e.g. a circular shape, an elliptical shape, a triangular shape, polygonal shapes with five or more corners, etc.) other than the rectangular shape, may be used as a segment conductor that constitutes the segment conductors 10.

(7) A configuration disclosed in each of the embodiments discussed above can also be applied in combination with a configuration disclosed in any other embodiment (including a combination of the other embodiments described above) unless any contradiction occurs. Also regarding the other configurations, the embodiments disclosed herein are merely illustrative in all respects. Thus, a variety of alterations can be made, as appropriate, without departing from the scope and spirit of the present disclosure.

Overview of Above Embodiments

An overview of the coil described above will be described below.

A coil (1) wound around a core (90) in which a plurality of slots (91) that extend in an axial direction (L) are arranged in a circumferential direction (C), the coil including: a plurality of slot-housed portions (60) respectively disposed in the slots (91); and a plurality of crossover portions (20) that each connect between a first slot-housed portion (61) and a second slot-housed portion (62), which are a pair of slot-housed portions (60) disposed in slots (91) that are different from each other, on an outer side in the axial direction (L) with respect to the core (90), in which: the plurality of crossover portions (20) include a first crossover portion (20a) that connects between the first slot-housed portion (61) and the second slot-housed portion (62) which are disposed in layers that are adjacent to each other in a radial direction (R), a second crossover portion (20b) that connects between the first slot-housed portion (61) and the second slot-housed portion (62) which are disposed in a layer on an outermost side (R2) in the radial direction (R), and a third crossover portion (20c) disposed on an opposite side, in the axial direction (L), of the core (90) from a side on which the second crossover portion (20b) is disposed to connect between the first slot-housed portion (61) and the second slot-housed portion (62) which are disposed in a layer on an innermost side (R1) in the radial direction (R); the first crossover portion (20a) includes a portion (31) disposed at a position in the radial direction (R) corresponding to the first slot-housed portion (61) and a portion (32) disposed at a position in the radial direction (R) corresponding to the second slot-housed portion (62); the second crossover portion (20b) includes a portion (31) disposed at the position in the radial direction (R) corresponding to the first slot-housed portion (61), an outside portion (33) disposed on an outer side (R2) in the radial direction (R) with respect to the position in the radial direction (R) corresponding to the first slot-housed portion (61) and the position in the radial direction (R) corresponding to the second slot-housed portion (62), and a portion (32) disposed at the position in the radial direction (R) corresponding to the second slot-housed portion (62); the third crossover portion (20c) includes a portion (31) disposed at the position in the radial direction (R) corresponding to the first slot-housed portion (61), an inside portion (34) disposed on an inner side (R1) in the radial direction (R) with respect to the position in the radial direction (R) corresponding to the first slot-housed portion (61) and the position in the radial direction (R) corresponding to the second slot-housed portion (62), and a portion (32) disposed at the position in the radial direction (R) corresponding to the second slot-housed portion (62); and the coil (1) is constituted by joining a first segment conductor (10a), which has at least a part of the first crossover portion (20a), a second segment conductor (10b), which has at least the outside portion (33) of the second crossover portion (20b), and a third segment conductor (10c), which has at least the inside portion (34) of the third crossover portion (20c), to each other.

With the configuration described above, the second crossover portion (20b) which connects between the pair of slot-housed portions (60) which are disposed in the layer (i.e. outermost layer) the outermost side (R2) in the radial direction (R) and the third crossover portion (20c) which connects between the pair of slot-housed portions (60) which are disposed in the layer (i.e. innermost layer) on the innermost side (R1) in the radial direction (R) are disposed on the opposite sides from each other in the axial direction (L) with respect to the core (90). Hence, it is possible to achieve a coil (1) in which the number of the slot-housed portions (60) which are disposed side by side in the radial direction (R) in each slot (91) is an odd number.

With the configuration described above, the second crossover portion (20b) includes the outside portion (33), and therefore it is possible to dispose the plurality of second crossover portions (20b) such that the respective arrangement regions thereof in the circumferential direction (C) partially overlap each other while avoiding interference therebetween. In addition, the third crossover portion (20c) includes the inside portion (34), and therefore it is possible to dispose the plurality of third crossover portions (20c) such that the respective arrangement regions thereof in the circumferential direction (C) partially overlap each other while avoiding interference therebetween. Hence, the coil (1) which includes the plurality of second crossover portions (20b) and the plurality of third crossover portions (20c) can be formed appropriately.

With the configuration described above, moreover, the coil (1) is constituted by joining the first segment conductor (10a) which has at least a part of the first crossover portion (20a), the second segment conductor (10b) which has at least the outside portion (33) of the second crossover portion (20b), and the third segment conductor (10c) which has at least the inside portion (34) of the third crossover portion (20c). That is, the outside portion (33) and the inside portion (34) which are disposed on the opposite sides from each other in the axial direction (L) with respect to the core (90) are required in order to appropriately form a coil (1) in which the number of the slot-housed portions (60) which are disposed side by side in the radial direction (R) in each slot (91) is an odd number, and the outside portion (33) and the inside portion (34) can be provided to the segment conductors (10) which are different from each other. Hence, it is possible to achieve a coil (1) in which the number of the slot-housed portions described above is an odd number while appropriately securing the ease of disposing the segment conductors (10) in the core (90).

As described above, with the configuration described above, it is possible to appropriately form a coil (1), in which the number of slot-housed portions (60) disposed side by side in the radial direction (R) in each slot (91) is an odd number, using a plurality of segment conductors (10).

Preferably, each of the first segment conductor (10a), the second segment conductor (10b), and the third segment conductor (10c) has two or less slot-housed portions (60).

With this configuration, each of the first segment conductor (10a), the second segment conductor (10b), and the third segment conductor (10c) is shaped to enable the slot-housed portion (60) to be inserted into the slot (91) in the axial direction (L). Hence, it is possible to achieve a coil (1) in which the number of the slot-housed portions (60) which are disposed side by side in the radial direction (R) in each slot (91) is an odd number while appropriately securing the ease of disposing the slot-housed portions (60) in the respective slots (91).

Preferably, the first segment conductor (10a) has an entire circumferential extension portion (50), which extends in the circumferential direction (C), of the first crossover portion (20a); the second segment conductor (10b) has an entire circumferential extension portion (50), which extends in the circumferential direction (C), of the second crossover portion (20b); the third segment conductor (10c) has an entire circumferential extension portion (50), which extends in the circumferential direction (C), of the third crossover portion (20c); a side on which the third crossover portion (20c) is disposed with respect to the core (90) in the axial direction (L) is defined as a first axial side (L1) and a side on an opposite side from the first axial side (L1) is defined as a second axial side (L2); the first segment conductor (10a) which has the circumferential extension portion (50) of the first crossover portion (20a) which is disposed on the first axial side (L1) with respect to the core (90) and the first segment conductor (10a) which has the circumferential extension portion (50) of the first crossover portion (20a) which is disposed on the second axial side (L2) with respect to the core (90) are joined to each other; the first segment conductor (10a) which has the circumferential extension portion (50) of the first crossover portion (20a) which is disposed on the first axial side (L1) with respect to the core (90) and the second segment conductor (10b) are joined to each other; and the first segment conductor (10a) which has the circumferential extension portion (50) of the first crossover portion (20a) which is disposed on the second axial side (L2) with respect to the core (90) and the third segment conductor (10c) are joined to each other.

With this configuration, it is possible to join different first segment conductors (10a) to each other, join the first segment conductor (10a) and the second segment conductor (10b) to each other, and join the first segment conductor (10a) and the third segment conductor (10c) to each other without processing, such as bending, each of the segment conductors (10) which have the slot-housed portions (60), among the first segment conductors (10a), the second segment conductors (10b), and the third segment conductors (10c), after inserting the slot-housed portions (60) into the slots (91). Hence, it is possible to simplify the process of forming the coil (1) by disposing the plurality of segment conductors (10) in the core (90) and joining the segment conductors (10) to each other.

Preferably, at least the first segment conductors (10a) which are different from each other are joined to each other in the slot (91).

With this configuration, the joint location (63) between the first segment conductors (10a) which are different from each other can be disposed in the slot (91). Therefore, the length of the coil (1) in the axial direction (L) can be shortened easily compared to a case where the first segment conductors (10a) which are different from each other are joined to each other on the outer side in the axial direction (L) with respect to the core (90).

Preferably, each of the segment conductors (10) including the first segment conductor (10a), the second segment conductor (10b), and the third segment conductor (10c) has two slot-housed portions (60), the crossover portion (20) which is disposed on a first axial side (L1), which is one side in the axial direction (L), with respect to the core (90) to connect between the two slot-housed portions (60), and extending portions (70) that respectively extend from the two slot-housed portions (60) to be disposed on a second axial side (L2), which is an opposite side of the core (90) from the first axial side (L1); and the crossover portion (20) which is disposed on the second axial side (L2) with respect to the core (90) is formed by joining the extending portions (70) of different segment conductors (10) to each other.

With this configuration, it is possible to make the direction, in the axial direction (L), of inserting the slot-housed portions (60) into the slots (91) to dispose the slot-housed portions (60) in the slots (91) the same among the first segment conductor (10a), the second segment conductor (10b), and the third segment conductor (10c). As a result, it is possible to provide the joint portions between different segment conductors (10) exclusively on the same side (second axial side (L2)) in the axial direction (L) with respect to the core (90), and simplify the process of disposing the plurality of segment conductors (10) in the core (90) and joining the segment conductors (10) to each other.

In the configuration in which the crossover portion (20) which is disposed on the second axial side (L2) with respect to the core (90) is formed by joining the extending portions (70) of different segment conductors (10) to each other as described above, preferably, an entirety of the second crossover portion (20b) is included in the second segment conductor (10b), and the third crossover portion (20c) is formed by joining the extending portion (70) of the first segment conductor (10a) and the extending portion (70) of the third segment conductor (10c) to each other; or an entirety of the third crossover portion (20c) is included in the third segment conductor (10c), and the second crossover portion (20b) is formed by joining the extending portion (70) of the first segment conductor (10a) and the extending portion (70) of the second segment conductor (10b) to each other.

With this configuration, it is possible to appropriately form both the second crossover portion (20b) and the third crossover portion (20c) while making the direction, in the axial direction (L), of inserting the slot-housed portions (60) into the slots (91) to dispose the slot-housed portions (60) in the slots (91) the same among the first segment conductor (10a), the second segment conductor (10b), and the third segment conductor (10c).

In the coil (1) with each of the configurations described above, preferably, the number of the slot-housed portions (60) which are disposed side by side in the radial direction (R) in each slot (91) is an odd number of three or more.

In order that a device (such as a rotary electric machine) which the coil (1) is used has desired characteristics, it is occasionally desirable that the number of slot-housed portions (60) disposed side by side in the radial direction (R) in each slot (91) should be an odd number of three or more. With the technique according to the present disclosure, the coil (1) which meets such a requirement can be formed appropriately using the plurality of segment conductors (10).

Preferably, each of the first segment conductor (10a), the second segment conductor (10b), and the third segment conductor (10c) is a linear conductor with its cross section, orthogonal to an extension direction, having a rectangular shape.

With this configuration, the performance of the device (such as a rotary electric machine) in which the coil (1) is used can be improved by enhancing the space factor of the coil (1) in the slots (91).

It is only necessary that the coil according to the present disclosure should achieve at least one of the effects discussed above.

The invention claimed is:

1. A coil wound around a core in which a plurality of slots that extend in an axial direction are arranged in a circumferential direction, the coil comprising:
  a plurality of slot-housed portions respectively disposed in the plurality of slots; and
  a plurality of crossover portions that each connect between a first slot-housed portion and a second slot-housed portion, which are a pair of slot-housed portions of the plurality of slot-housed portions disposed in slots of the plurality of slots that are different from each other, on an outer side in the axial direction with respect to the core, wherein:

the plurality of crossover portions include a first crossover portion that connects between the first slot-housed portion and the second slot-housed portion which are disposed in layers that are adjacent to each other in a radial direction, a second crossover portion that connects between the first slot-housed portion and the second slot-housed portion which are disposed in a layer on an outermost side in the radial direction, and a third crossover portion disposed on an opposite side, in the axial direction, of the core from a side on which the second crossover portion is disposed to connect between the first slot-housed portion and the second slot-housed portion which are disposed in a layer on an innermost side in the radial direction;

the first crossover portion includes a portion disposed at a position in the radial direction corresponding to the first slot-housed portion and a portion disposed at a position in the radial direction corresponding to the second slot-housed portion;

the second crossover portion includes a portion disposed at the position in the radial direction corresponding to the first slot-housed portion, an outside portion disposed on an outer side in the radial direction with respect to the position in the radial direction corresponding to the first slot-housed portion and the position in the radial direction corresponding to the second slot-housed portion, and a portion disposed at the position in the radial direction corresponding to the second slot-housed portion;

the third crossover portion includes a portion disposed at the position in the radial direction corresponding to the first slot-housed portion, an inside portion disposed on an inner side in the radial direction with respect to the position in the radial direction corresponding to the first slot-housed portion and the position in the radial direction corresponding to the second slot-housed portion, and a portion disposed at the position in the radial direction corresponding to the second slot-housed portion; and the coil is formed by joining a first segment conductor, which has at least a part of the first crossover portion, a second segment conductor, which has at least the outside portion of the second crossover portion, and a third segment conductor, which has at least the inside portion of the third crossover portion, to each other.

2. The coil according to claim 1, wherein
each of the first segment conductor, the second segment conductor, and the third segment conductor has two or less slot-housed portions of the plurality of slot-housed portions.

3. The coil according to claim 1, wherein:
the first segment conductor has an entire circumferential extension portion, which extends in the circumferential direction, of the first crossover portion;
the second segment conductor has an entire circumferential extension portion, which extends in the circumferential direction, of the second crossover portion;
the third segment conductor has an entire circumferential extension portion, which extends in the circumferential direction, of the third crossover portion;

a side on which the third crossover portion is disposed with respect to the core in the axial direction is defined as a first axial side and a side on an opposite side from the first axial side is defined as a second axial side;
the first segment conductor which has the circumferential extension portion of the first crossover portion which is disposed on the first axial side with respect to the core and the first segment conductor which has the circumferential extension portion of the first crossover portion which is disposed on the second axial side with respect to the core are joined to each other;
the first segment conductor which has the circumferential extension portion of the first crossover portion which is disposed on the first axial side with respect to the core and the second segment conductor are joined to each other; and
the first segment conductor which has the circumferential extension portion of the first crossover portion which is disposed on the second axial side with respect to the core and the third segment conductor are joined to each other.

4. The coil according to claim 1, wherein
at least the first segment conductors which are different from each other are joined to each other in the slot.

5. The coil according to claim 1, wherein:
each of the segment conductors including the first segment conductor, the second segment conductor, and the third segment conductor has two slot-housed portions of the plurality of slot housed portions, the crossover portion which is disposed on a first axial side, which is one side in the axial direction, with respect to the core to connect between the two slot-housed portions, and extending portions that respectively extend from the two slot-housed portions to be disposed on a second axial side, which is an opposite side of the core from the first axial side; and
the crossover portion which is disposed on the second axial side with respect to the core is formed by joining the extending portions of different segment conductors to each other.

6. The coil according to claim 5, wherein:
an entirety of the second crossover portion is included in the second segment conductor, and the third crossover portion is formed by joining the extending portion of the first segment conductor and the extending portion of the third segment conductor to each other; or
an entirety of the third crossover portion is included in the third segment conductor, and the second crossover portion is formed by joining the extending portion of the first segment conductor and the extending portion of the second segment conductor to each other.

7. The coil according to claim 1, wherein
the number of the slot-housed portions which are disposed side by side in the radial direction in each slot is an odd number of three or more.

8. The coil according to claim 1, wherein
each of the first segment conductor, the second segment conductor, and the third segment conductor is a linear conductor with a cross section, orthogonal to an extension direction, having a rectangular shape.

* * * * *